US009809737B2

(12) United States Patent
Roddy et al.

(10) Patent No.: US 9,809,737 B2
(45) Date of Patent: *Nov. 7, 2017

(54) COMPOSITIONS CONTAINING KILN DUST AND/OR BIOWASTE ASH AND METHODS OF USE

(71) Applicant: Halliburton Energy Services, Inc., Houston, TX (US)

(72) Inventors: Craig W. Roddy, Duncan, OK (US); Ronnie G. Morgan, Waurika, OK (US); James R. Benkley, Duncan, OK (US); D. Chad Brenneis, Marlow, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 345 days.

This patent is subject to a terminal disclaimer.

(21) Appl. No.: 13/769,442

(22) Filed: Feb. 18, 2013

(65) Prior Publication Data

US 2013/0153214 A1 Jun. 20, 2013

Related U.S. Application Data

(63) Continuation-in-part of application No. 13/725,833, filed on Dec. 21, 2012, now Pat. No. 8,505,630, which is a continuation-in-part of application No. 13/535,145, filed on Jun. 27, 2012, now Pat. No. 8,505,629, which is a continuation-in-part of application No. 12/895,436, filed on Sep. 30, 2010, now Pat. No. 8,522,873, which is a continuation-in-part of application No. 12/264,010, filed on Nov. 3, 2008, now Pat. No. 8,333,240, which is a continuation-in-part of application No. 11/223,669, filed on Sep. 9, 2005, now Pat. No. 7,445,669, application No. 13/769,442, filed on Feb. 18, 2013, which is a continuation-in-part of application No. 12/497,402, filed on Jul. 2, 2009, now Pat. No. 8,733,440.

(51) Int. Cl.

| C09K 8/42 | (2006.01) |
| E21B 33/13 | (2006.01) |
| C04B 28/02 | (2006.01) |
| C04B 28/04 | (2006.01) |
| C09K 8/03 | (2006.01) |
| C09K 8/40 | (2006.01) |
| C09K 8/46 | (2006.01) |
| C09K 8/60 | (2006.01) |
| C04B 28/06 | (2006.01) |
| C04B 28/08 | (2006.01) |
| C04B 28/14 | (2006.01) |
| C04B 111/00 | (2006.01) |

(52) U.S. Cl.

CPC ............ *C09K 8/424* (2013.01); *C04B 28/021* (2013.01); *C04B 28/04* (2013.01); *C04B 28/06* (2013.01); *C04B 28/08* (2013.01); *C04B 28/14* (2013.01); *C09K 8/03* (2013.01); *C09K 8/40* (2013.01); *C09K 8/46* (2013.01); *C09K 8/60* (2013.01); *E21B 33/13* (2013.01); *C04B 2111/00017* (2013.01); *C09K 2208/04* (2013.01); *Y02W 30/92* (2015.05); *Y02W 30/94* (2015.05); *Y02W 30/95* (2015.05)

(58) Field of Classification Search

CPC .............. C09K 8/00; C09K 8/02; C09K 8/03

See application file for complete search history.

(56) References Cited

U.S. PATENT DOCUMENTS

| 1,931,921 A | 10/1933 | Breerwood |
| 2,021,956 A | 11/1935 | Gladney et al. |
| 2,045,899 A | 6/1936 | Davis |
| 2,094,316 A | 9/1937 | Cross et al. |
| 2,133,622 A | 10/1938 | Larmour et al. |

(Continued)

FOREIGN PATENT DOCUMENTS

| CA | 2064682 | 4/1992 |
| CA | 2336077 | 1/2000 |

(Continued)

OTHER PUBLICATIONS

"Spacers and Flushers in cementing," Jun. 25, 2015, Petrowiki, retrieved Mar. 27, 2017 from http://petrowiki.org/Spacers_and_flushers_in_cementing.*

"Yield point" 2017, Schlumberger, retrieved Mar. 27, 2017 from http://www.glossary.oilfield.slb.com/Terms/y/yield_point.aspx.*

Editions Technip, "Drilling Mud and Cement Slurry Rheology Manual," 1982, Editions Technip, Paris, p. 49, section 2.9.1.2 Yield Point.*

Final Office Action from USPTO for U.S. Appl. No. 13/477,777 dated May 29, 2013.

Office Action from USPTO for U.S. Appl. No. 13/620,013 dated May 28, 2013.

Notice of Allowance from USPTO for U.S. Appl. No. 13/560,406 dated May 29, 2013.

(Continued)

*Primary Examiner* — Angela M DiTrani

(74) *Attorney, Agent, or Firm* — Craig W. Roddy; Tumey L.L.P.

(57) ABSTRACT

An embodiment comprises a method of treating a subterranean formation comprising: providing a treatment fluid comprising a kiln dust, biowaste ash, and water; and introducing the treatment fluid into a subterranean formation. Another embodiment comprises a method of cementing comprising: introducing a cement composition into a subterranean formation, wherein the cement composition comprises a kiln dust, biowaste ash, and water; and allowing the cement composition to set in the subterranean formation. Yet another embodiment comprises a method comprising: providing a spacer fluid comprising biowaste ash and water; introducing the spacer fluid into a well bore to displace at least a portion of a first fluid from the well bore; and introducing a cement composition into the well bore, wherein the spacer fluid separates the cement composition and the first fluid.

25 Claims, No Drawings

(56) References Cited

U.S. PATENT DOCUMENTS

| | | |
|---|---|---|
| 2,144,254 A | 1/1939 | Breerwood |
| 2,193,775 A | 3/1940 | Stratford |
| 2,193,807 A | 3/1940 | Dieterich |
| 2,214,715 A | 9/1940 | Breerwood |
| 2,329,940 A | 9/1943 | Ponzer |
| 2,592,468 A | 4/1952 | Rex et al. |
| 2,772,739 A | 12/1956 | Arie |
| 2,805,719 A | 9/1957 | Anderson |
| 2,842,205 A | 7/1958 | Allen et al. |
| 2,844,361 A | 7/1958 | Dilcher et al. |
| 2,848,051 A | 8/1958 | Williams |
| 2,871,133 A | 1/1959 | Palonen et al. |
| 2,880,096 A | 3/1959 | Hurley |
| 2,945,769 A | 7/1960 | Gama et al. |
| 3,024,125 A | 3/1962 | Lee |
| 3,066,031 A | 11/1962 | Schifferle |
| 3,168,139 A | 2/1965 | Kennedy et al. |
| 3,320,077 A | 5/1967 | Prior |
| 3,335,798 A | 8/1967 | Querio et al. |
| 3,411,580 A | 11/1968 | Roberts et al. |
| 3,421,703 A | 1/1969 | Galer |
| 3,454,095 A | 7/1969 | Messenger et al. |
| 3,467,193 A | 9/1969 | McColl et al. |
| 3,473,939 A | 10/1969 | Mayberry et al. |
| 3,499,491 A | 3/1970 | Wyant et al. |
| 3,557,876 A | 1/1971 | Tragesser |
| 3,574,113 A | 4/1971 | Shannon |
| 3,574,816 A | 4/1971 | Abbdellatif et al. |
| 3,628,973 A | 12/1971 | Greening et al. |
| 3,748,159 A | 7/1973 | George |
| 3,749,173 A | 7/1973 | Hill et al. |
| 3,849,316 A * | 11/1974 | Motley et al. .................. 507/219 |
| 3,863,718 A | 2/1975 | Bruist |
| 3,876,005 A | 4/1975 | Fincher et al. |
| 3,887,009 A | 6/1975 | Miller et al. |
| 3,887,385 A | 6/1975 | Quist et al. |
| 3,921,717 A | 11/1975 | Danjushevsky et al. |
| 3,959,007 A | 5/1976 | Pitt |
| 4,018,617 A | 4/1977 | Nicholson |
| 4,018,619 A | 4/1977 | Webster et al. |
| 4,031,184 A | 6/1977 | McCord |
| 4,036,301 A | 7/1977 | Powers et al. |
| 4,083,407 A | 4/1978 | Griffin et al. |
| 4,101,332 A | 7/1978 | Nicholson |
| 4,105,459 A | 8/1978 | Mehta |
| 4,141,843 A | 2/1979 | Watson |
| 4,160,674 A | 6/1979 | Sawyer |
| 4,176,720 A | 12/1979 | Wilson |
| 4,249,954 A | 2/1981 | Keogh |
| 4,268,316 A | 5/1981 | Wills et al. |
| 4,274,881 A | 6/1981 | Langton |
| 4,304,300 A | 12/1981 | Watson |
| 4,333,764 A | 6/1982 | Richardson |
| 4,341,562 A | 7/1982 | Ahlbeck |
| RE31,190 E | 3/1983 | Detroit et al. |
| 4,400,474 A | 8/1983 | Copperthwaite et al. |
| 4,407,677 A | 10/1983 | Wills et al. |
| 4,423,781 A | 1/1984 | Thomas |
| 4,432,800 A | 2/1984 | Kneller et al. |
| 4,435,216 A | 3/1984 | Diehl et al. |
| 4,436,850 A | 3/1984 | Burdick et al. |
| 4,440,576 A | 4/1984 | Flannery et al. |
| 4,460,292 A | 7/1984 | Durham et al. |
| 4,462,835 A | 7/1984 | Car |
| 4,432,666 A | 8/1984 | Frey et al. |
| 4,470,463 A | 9/1984 | Holland |
| 4,494,990 A | 1/1985 | Harris |
| 4,515,635 A | 5/1985 | Rao et al. |
| 4,519,452 A | 5/1985 | Tsao et al. |
| 4,540,316 A | 9/1985 | Takahashi |
| 4,555,269 A | 11/1985 | Rao et al. |
| 4,614,599 A | 9/1986 | Walker |
| 4,624,711 A | 11/1986 | Styron |
| 4,633,950 A | 1/1987 | Delhommer et al. |
| 4,676,317 A | 6/1987 | Fry et al. |
| 4,676,832 A | 6/1987 | Childs et al. |
| 4,741,782 A | 5/1988 | Styron |
| 4,784,223 A | 11/1988 | Worrall et al. |
| 4,829,107 A | 5/1989 | Kindt |
| 4,883,125 A | 11/1989 | Wilson et al. |
| 4,941,536 A | 7/1990 | Brothers et al. |
| 4,992,102 A | 2/1991 | Barbour |
| 5,030,366 A | 7/1991 | Wilson et al. |
| 5,049,288 A | 9/1991 | Brothers et al. |
| 5,058,679 A | 10/1991 | Hale et al. |
| RE33,747 E | 11/1991 | Hartley et al. |
| 5,086,850 A | 2/1992 | Harris et al. |
| 5,098,612 A | 3/1992 | Roswell |
| 5,133,943 A | 5/1992 | Wilson et al. |
| 5,121,795 A | 6/1992 | Ewert et al. |
| 5,123,487 A | 6/1992 | Harris et al. |
| 5,125,455 A | 6/1992 | Harris et al. |
| 5,127,473 A | 7/1992 | Harris et al. |
| 5,183,505 A | 2/1993 | Spinney |
| 5,183,506 A | 2/1993 | Zhang |
| 5,213,160 A | 5/1993 | Nahm et al. |
| 5,215,585 A | 6/1993 | Luthra et al. |
| 5,229,018 A * | 7/1993 | Forrest .................. C09K 8/035 |
| | | 166/283 |
| 5,238,064 A | 8/1993 | Dahl et al. |
| 5,252,128 A | 10/1993 | Gopalkrishnan |
| 5,266,111 A | 11/1993 | Barbour |
| 5,286,430 A | 2/1994 | Downs et al. |
| 5,290,355 A | 3/1994 | Jakel et al. |
| 5,295,543 A | 3/1994 | Terry et al. |
| 5,305,831 A | 4/1994 | Nahm |
| 5,314,022 A | 5/1994 | Cowan et al. |
| 5,316,083 A | 5/1994 | Nahm et al. |
| 5,318,382 A | 6/1994 | Cahill |
| 5,327,968 A | 7/1994 | Onan et al. |
| 5,337,824 A | 8/1994 | Cowan |
| 5,339,902 A | 8/1994 | Harris |
| 5,346,548 A | 9/1994 | Mehta |
| 5,352,288 A * | 10/1994 | Mallow ........................ 106/605 |
| 5,358,044 A | 10/1994 | Hale et al. |
| 5,358,049 A | 10/1994 | Hale et al. |
| 5,361,841 A | 11/1994 | Hale et al. |
| 5,361,842 A | 11/1994 | Hale et al. |
| 5,368,103 A | 11/1994 | Heathman et al. |
| 5,370,185 A | 12/1994 | Cowan et al. |
| 5,372,641 A | 12/1994 | Carpenter |
| 5,382,290 A | 1/1995 | Nahm et al. |
| 5,383,521 A | 1/1995 | Onan et al. |
| 5,383,967 A | 1/1995 | Chase |
| 5,398,758 A | 3/1995 | Onan et al. |
| 5,417,759 A | 5/1995 | Huddleston |
| 5,421,409 A | 6/1995 | Mueller et al. |
| 5,423,379 A | 6/1995 | Hale et al. |
| 5,430,235 A | 7/1995 | Hooykaas et al. |
| 5,439,056 A | 8/1995 | Cowan |
| 5,456,751 A | 10/1995 | Zandi et al. |
| 5,458,195 A | 10/1995 | Totten et al. |
| 5,464,060 A | 11/1995 | Hale et al. |
| 5,466,407 A | 11/1995 | Downs et al. |
| 5,472,051 A | 12/1995 | Brothers |
| 5,476,144 A | 12/1995 | Nahm et al. |
| 5,478,391 A | 12/1995 | Babaev et al. |
| 5,484,019 A | 1/1996 | Griffith |
| 5,494,513 A | 2/1996 | Fu et al. |
| 5,499,677 A | 3/1996 | Cowan |
| 5,501,277 A * | 3/1996 | Onan ...................... C04B 28/18 |
| | | 106/706 |
| 5,515,921 A | 5/1996 | Cowan et al. |
| 5,518,996 A | 5/1996 | Maroy et al. |
| 5,520,730 A | 5/1996 | Barbour |
| 5,529,123 A | 6/1996 | Carpenter et al. |
| 5,529,624 A | 6/1996 | Riegler |
| 5,536,311 A | 7/1996 | Rodrigues |
| 5,542,782 A | 8/1996 | Carter et al. |
| 5,554,352 A | 9/1996 | Jaques et al. |
| 5,569,324 A | 10/1996 | Totten et al. |
| 5,580,379 A | 12/1996 | Cowan |
| 5,585,333 A | 12/1996 | Dahl et al. |
| 5,588,489 A | 12/1996 | Chatterji et al. |

(56) References Cited

U.S. PATENT DOCUMENTS

| | | |
|---|---|---|
| 5,641,584 A | 6/1997 | Andersen et al. |
| 5,673,753 A | 10/1997 | Hale et al. |
| 5,681,384 A | 10/1997 | Liskowitz et al. |
| 5,688,844 A | 11/1997 | Chatterji et al. |
| 5,711,383 A | 1/1998 | Terry et al. |
| 5,716,910 A | 2/1998 | Totten et al. |
| 5,728,654 A | 3/1998 | Dobson et al. |
| 5,789,352 A | 8/1998 | Carpenter |
| 5,795,924 A | 8/1998 | Chatterji et al. |
| 5,820,670 A | 10/1998 | Chatterji et al. |
| 5,851,960 A | 12/1998 | Totten et al. |
| 5,866,516 A | 2/1999 | Costin |
| 5,866,517 A * | 2/1999 | Carpenter et al. ............ 507/226 |
| 5,874,387 A | 2/1999 | Carpenter et al. |
| 5,875,845 A | 3/1999 | Chatterji et al. |
| 5,897,699 A | 4/1999 | Chatterji et al. |
| 5,900,053 A | 5/1999 | Brothers et al. |
| 5,904,208 A * | 5/1999 | Ray ......................... C09K 8/52 166/270.1 |
| 5,913,364 A | 6/1999 | Sweatman |
| 5,968,254 A * | 10/1999 | Dodgen ............... C04B 18/068 106/679 |
| 5,988,279 A | 11/1999 | Udarbe et al. |
| 6,002,063 A | 12/1999 | Bilak et al. |
| 6,022,408 A | 2/2000 | Stokes et al. |
| 6,060,434 A | 5/2000 | Sweatman et al. |
| 6,060,535 A | 5/2000 | Villar et al. |
| 6,063,738 A | 5/2000 | Chatterji et al. |
| 6,098,711 A | 8/2000 | Chatterji et al. |
| 6,138,759 A | 10/2000 | Chatterji et al. |
| 6,143,069 A | 11/2000 | Brothers et al. |
| 6,145,591 A | 11/2000 | Boncan et al. |
| 6,153,562 A | 11/2000 | Villar et al. |
| 6,167,967 B1 | 1/2001 | Sweatman |
| 6,170,575 B1 | 1/2001 | Reddy et al. |
| 6,196,316 B1 | 3/2001 | Bosma et al. |
| 6,220,354 B1 | 4/2001 | Chatterji et al. |
| 6,230,804 B1 | 5/2001 | Mueller et al. |
| 6,244,343 B1 | 6/2001 | Brothers et al. |
| 6,245,142 B1 | 6/2001 | Reddy et al. |
| 6,258,757 B1 | 7/2001 | Sweatman et al. |
| 6,264,738 B1 | 7/2001 | Lorke et al. |
| 6,277,189 B1 | 8/2001 | Chugh |
| 6,312,515 B1 | 11/2001 | Barlet-Gouedard et al. |
| 6,315,042 B1 | 11/2001 | Griffith et al. |
| 6,328,106 B1 | 12/2001 | Griffith et al. |
| 6,332,921 B1 | 12/2001 | Brothers et al. |
| 6,367,550 B1 | 4/2002 | Chatterji et al. |
| 6,379,456 B1 | 4/2002 | Heathman et al. |
| 6,402,833 B1 | 6/2002 | O'Hearn et al. |
| 6,409,819 B1 | 6/2002 | Ko |
| 6,416,574 B1 | 7/2002 | Steelhammer et al. |
| 6,451,104 B2 | 9/2002 | Mehta |
| 6,457,524 B1 | 10/2002 | Roddy |
| 6,478,869 B2 | 11/2002 | Reddy et al. |
| 6,488,763 B2 | 12/2002 | Brothers et al. |
| 6,488,764 B2 | 12/2002 | Westerman |
| 6,494,951 B1 | 12/2002 | Reddy et al. |
| 6,500,252 B1 | 12/2002 | Chatterji et al. |
| 6,502,634 B1 | 1/2003 | Evans et al. |
| 6,508,305 B1 | 1/2003 | Brannon et al. |
| 6,516,884 B1 | 2/2003 | Chatterji et al. |
| 6,524,384 B2 | 2/2003 | Griffith et al. |
| 6,547,871 B2 | 4/2003 | Chatterji et al. |
| 6,547,891 B2 | 4/2003 | Linden et al. |
| 6,555,307 B2 | 4/2003 | Maruyama |
| 6,561,273 B2 | 5/2003 | Brothers et al. |
| 6,562,122 B2 | 5/2003 | Dao et al. |
| 6,565,647 B1 | 5/2003 | Day et al. |
| 6,572,697 B2 | 6/2003 | Gleeson et al. |
| 6,610,139 B2 | 8/2003 | Reddy et al. |
| 6,626,243 B1 | 9/2003 | Go Boncan |
| 6,630,429 B1 * | 10/2003 | Cremeans ............... C09K 8/206 175/72 |
| 6,641,658 B1 | 11/2003 | Dubey |
| 6,645,289 B2 | 11/2003 | Sobolev et al. |
| 6,645,290 B1 | 11/2003 | Barbour |
| 6,656,265 B1 | 12/2003 | Garnier et al. |
| 6,660,080 B2 | 12/2003 | Reddy et al. |
| 6,666,268 B2 | 12/2003 | Griffith et al. |
| 6,668,927 B1 * | 12/2003 | Chatterji et al. ............. 166/291 |
| 6,668,929 B2 | 12/2003 | Griffith et al. |
| 6,689,208 B1 | 2/2004 | Brothers |
| 6,702,044 B2 | 3/2004 | Reddy et al. |
| 6,706,108 B2 | 3/2004 | Polston |
| 6,708,760 B1 | 3/2004 | Chatterji et al. |
| 6,715,568 B1 | 4/2004 | Bailey |
| 6,716,282 B2 | 4/2004 | Griffith et al. |
| 6,729,405 B2 | 5/2004 | DiLullo et al. |
| 6,749,679 B2 | 6/2004 | Shi |
| 6,755,905 B2 | 6/2004 | Oates et al. |
| 6,767,398 B2 | 7/2004 | Trato |
| 6,776,237 B2 | 8/2004 | Dao et al. |
| 6,796,378 B2 | 9/2004 | Reddy et al. |
| 6,797,054 B2 | 9/2004 | Chatterji et al. |
| 6,823,940 B2 | 11/2004 | Reddy et al. |
| 6,832,652 B1 | 12/2004 | Dillenbeck et al. |
| 6,835,243 B2 | 12/2004 | Brothers et al. |
| 6,837,316 B2 | 1/2005 | Reddy et al. |
| 6,840,318 B2 | 1/2005 | Lee |
| 6,846,357 B2 | 1/2005 | Reddy et al. |
| 6,848,519 B2 | 2/2005 | Reddy et al. |
| 6,869,474 B2 | 3/2005 | Perez-Pena |
| 6,869,475 B1 | 3/2005 | Krowl |
| 6,874,353 B2 | 4/2005 | Johnson |
| 6,874,578 B1 | 4/2005 | Garnier |
| 6,883,609 B2 | 4/2005 | Drochon |
| 6,887,833 B2 | 5/2005 | Brothers et al. |
| 6,889,767 B2 | 5/2005 | Reddy et al. |
| 6,904,971 B2 | 6/2005 | Brothers et al. |
| 6,908,508 B2 | 6/2005 | Brothers |
| 6,911,078 B2 | 6/2005 | Barlet-Gouedard et al. |
| 6,962,561 B2 | 11/2005 | Beuno et al. |
| 7,022,755 B1 | 4/2006 | Chatterji et al. |
| 7,048,053 B2 | 5/2006 | Santra et al. |
| 7,077,203 B1 | 7/2006 | Roddy et al. |
| 7,094,737 B1 * | 8/2006 | Sampey .................... 507/104 |
| 7,096,944 B2 | 8/2006 | Vargo et al. |
| 7,101,829 B2 | 9/2006 | Guichard |
| 7,137,945 B2 | 11/2006 | Hughes |
| 7,174,962 B1 | 2/2007 | Roddy et al. |
| 7,182,137 B2 | 2/2007 | Fyten et al. |
| 7,199,086 B1 * | 4/2007 | Roddy et al. ................ 507/269 |
| 7,204,307 B2 | 4/2007 | Roddy et al. |
| 7,204,310 B1 | 4/2007 | Roddy et al. |
| 7,213,646 B2 | 5/2007 | Roddy et al. |
| 7,219,733 B2 | 5/2007 | Luke et al. |
| 7,284,609 B2 | 10/2007 | Roddy et al. |
| 7,285,164 B2 | 10/2007 | Luke et al. |
| 7,285,166 B2 | 10/2007 | Luke et al. |
| 7,293,609 B2 | 11/2007 | Dealy |
| 7,303,015 B2 | 12/2007 | Fyten et al. |
| 7,325,611 B2 | 2/2008 | Santra et al. |
| 7,326,291 B2 | 2/2008 | Fyten et al. |
| 7,332,026 B2 | 2/2008 | Fyten et al. |
| 7,335,252 B2 | 2/2008 | Roddy et al. |
| 7,337,842 B2 | 3/2008 | Roddy et al. |
| 7,338,923 B2 | 3/2008 | Roddy et al. |
| 7,341,104 B2 | 3/2008 | Roddy et al. |
| 7,341,105 B2 | 3/2008 | Bingamon |
| 7,350,573 B2 | 4/2008 | Reddy |
| 7,353,870 B2 | 4/2008 | Roddy et al. |
| 7,381,263 B2 | 6/2008 | Roddy et al. |
| 7,387,675 B2 | 6/2008 | Roddy et al. |
| 7,395,860 B2 | 7/2008 | Roddy et al. |
| 7,404,855 B2 | 7/2008 | Chatterji et al. |
| 7,409,990 B1 | 8/2008 | Burts et al. |
| 7,442,248 B2 | 10/2008 | Timmons |
| 7,445,669 B2 | 11/2008 | Roddy et al. |
| 7,478,675 B2 | 1/2009 | Roddy et al. |
| 7,491,267 B2 | 2/2009 | Francis et al. |
| 7,607,482 B2 | 10/2009 | Roddy et al. |
| 7,607,484 B2 | 10/2009 | Roddy et al. |
| 7,627,870 B1 | 12/2009 | Michaeli et al. |

(56) References Cited

U.S. PATENT DOCUMENTS

| | | | |
|---|---|---|---|
| 7,631,692 B2 | 12/2009 | Roddy et al. | |
| 7,655,088 B2 | 2/2010 | Bethani | |
| 7,674,332 B2 | 3/2010 | Roddy et al. | |
| 7,708,071 B2 | 5/2010 | Roddy et al. | |
| 7,741,841 B2 | 6/2010 | Edwards et al. | |
| 7,743,828 B2 | 6/2010 | Roddy et al. | |
| 7,784,542 B2 | 8/2010 | Roddy et al. | |
| 7,789,150 B2 | 9/2010 | Roddy et al. | |
| 7,867,954 B2 | 1/2011 | Warrender et al. | |
| 7,887,694 B2 | 2/2011 | Constantz et al. | |
| 7,919,064 B2 | 4/2011 | Kawatra et al. | |
| 7,927,419 B2 | 4/2011 | Roddy | |
| 8,029,618 B2 | 10/2011 | Ai-Shafei | |
| 8,030,253 B2 | 10/2011 | Roddy et al. | |
| 8,039,253 B2 | 10/2011 | Asou | |
| 8,062,999 B2 | 11/2011 | Reddy et al. | |
| 8,143,198 B2 | 3/2012 | Lewis et al. | |
| 8,261,827 B2 | 9/2012 | Roddy | |
| 8,276,666 B2 | 10/2012 | Ravi et al. | |
| 8,281,859 B2 | 10/2012 | Roddy | |
| 8,297,357 B2 | 10/2012 | Brenneis | |
| 8,307,899 B2 | 11/2012 | Brenneis | |
| 8,318,642 B2 | 11/2012 | Roddy | |
| 8,327,939 B2 | 12/2012 | Roddy | |
| 8,333,240 B2 | 12/2012 | Roddy | |
| 8,394,744 B2 | 3/2013 | Woytowich et al. | |
| 8,399,387 B2 | 3/2013 | Roddy | |
| 8,403,045 B2 | 3/2013 | Brenneis et al. | |
| 8,434,553 B2 | 5/2013 | Brenneis et al. | |
| 8,440,596 B2 | 5/2013 | Brenneis et al. | |
| 8,486,868 B2 | 7/2013 | Brenneis et al. | |
| 8,486,869 B2 | 7/2013 | Brenneis et al. | |
| 8,505,629 B2 * | 8/2013 | Benkley et al. | 166/291 |
| 8,505,630 B2 * | 8/2013 | Chatterji et al. | 166/291 |
| 8,522,873 B2 * | 9/2013 | Benkley et al. | 166/291 |
| 8,544,543 B2 | 10/2013 | Chatterji et al. | |
| 8,544,854 B2 * | 10/2013 | Adams | 280/7.13 |
| 8,551,923 B1 | 10/2013 | Benkley et al. | |
| 8,554,543 B2 | 10/2013 | Cherepanov et al. | |
| 8,555,967 B2 | 10/2013 | Chatterji et al. | |
| 8,603,952 B2 | 12/2013 | Roddy et al. | |
| 8,672,028 B2 | 3/2014 | Karcher et al. | |
| 8,691,737 B2 | 4/2014 | Chatterji et al. | |
| 8,895,485 B2 * | 11/2014 | Roddy et al. | 507/269 |
| 2002/0033121 A1 | 3/2002 | Marko | |
| 2002/0073897 A1 | 6/2002 | Trato | |
| 2002/0117090 A1 | 8/2002 | Ku | |
| 2002/0157575 A1 | 10/2002 | DiLullo et al. | |
| 2003/0000423 A1 | 1/2003 | Vijn et al. | |
| 2003/0116065 A1 | 6/2003 | Griffith et al. | |
| 2003/0116887 A1 | 6/2003 | Scott | |
| 2003/0167970 A1 | 9/2003 | Polston | |
| 2003/0168215 A1 | 9/2003 | Drochon | |
| 2003/0234103 A1 | 12/2003 | Lee et al. | |
| 2004/0007162 A1 | 1/2004 | Morioka et al. | |
| 2004/0007360 A1 | 1/2004 | Leroy-Delage et al. | |
| 2004/0040474 A1 | 3/2004 | Perez-Pena et al. | |
| 2004/0040475 A1 | 3/2004 | De La Roij et al. | |
| 2004/0079260 A1 | 4/2004 | Datta et al. | |
| 2004/0107877 A1 | 6/2004 | Getzlaf et al. | |
| 2004/0108113 A1 | 6/2004 | Luke et al. | |
| 2004/0112600 A1 | 6/2004 | Luke et al. | |
| 2004/0129181 A1 | 7/2004 | Lalande et al. | |
| 2004/0163812 A1 | 8/2004 | Brothers | |
| 2004/0168804 A1 | 9/2004 | Reddy et al. | |
| 2004/0182577 A1 | 9/2004 | Chatterji et al. | |
| 2004/0187740 A1 | 9/2004 | Timmons | |
| 2004/0188091 A1 | 9/2004 | Luke et al. | |
| 2004/0191439 A1 | 9/2004 | Bour et al. | |
| 2004/0211562 A1 | 10/2004 | Brothers et al. | |
| 2004/0211564 A1 | 10/2004 | Brothers et al. | |
| 2004/0244650 A1 | 12/2004 | Brothers | |
| 2004/0244977 A1 | 12/2004 | Luke et al. | |
| 2004/0256102 A1 | 12/2004 | Trato | |
| 2004/0262000 A1 | 12/2004 | Morgan et al. | |
| 2005/0000734 A1 | 1/2005 | Getzlaf et al. | |
| 2005/0034867 A1 | 2/2005 | Griffith et al. | |
| 2005/0056191 A1 | 3/2005 | Brothers et al. | |
| 2005/0061505 A1 | 3/2005 | Caveny et al. | |
| 2005/0072599 A1 | 4/2005 | Luke et al. | |
| 2005/0077045 A1 | 4/2005 | Chatterji et al. | |
| 2005/0084334 A1 | 4/2005 | Shi et al. | |
| 2005/0098317 A1 | 5/2005 | Reddy et al. | |
| 2005/0133221 A1 | 6/2005 | Chatterji et al. | |
| 2005/0205255 A1 | 9/2005 | Gagliano et al. | |
| 2006/0025312 A1 | 2/2006 | Santra et al. | |
| 2006/0054319 A1 | 3/2006 | Fyten | |
| 2006/0065399 A1 | 3/2006 | Luke et al. | |
| 2006/0081372 A1 | 4/2006 | Dealy et al. | |
| 2006/0086499 A1 | 4/2006 | Badalamenti et al. | |
| 2006/0166834 A1 | 7/2006 | Roddy | |
| 2006/0175060 A1 | 8/2006 | Reddy | |
| 2006/0260512 A1 | 11/2006 | Nordmeyer | |
| 2007/0056475 A1 | 3/2007 | Roddy et al. | |
| 2007/0056479 A1 | 3/2007 | Gray | |
| 2007/0089643 A1 | 4/2007 | Roddy et al. | |
| 2007/0102157 A1 | 5/2007 | Roddy et al. | |
| 2007/0137528 A1 | 6/2007 | LeRoy-Delage et al. | |
| 2007/0186820 A1 | 8/2007 | O'Hearn | |
| 2007/0289744 A1 | 12/2007 | Bingamon | |
| 2008/0032901 A1 | 2/2008 | Hull et al. | |
| 2008/0092780 A1 | 4/2008 | Bingamon et al. | |
| 2008/0156491 A1 | 7/2008 | Roddy et al. | |
| 2008/0229979 A1 | 9/2008 | Lewis | |
| 2008/0236814 A1 | 10/2008 | Roddy | |
| 2008/0300149 A1 | 12/2008 | Reddy et al. | |
| 2009/0038801 A1 | 2/2009 | Ravi et al. | |
| 2009/0044726 A1 | 2/2009 | Brouillette et al. | |
| 2009/0065435 A1 * | 3/2009 | Li | B01D 15/00 210/669 |
| 2009/0124522 A1 | 5/2009 | Roddy et al. | |
| 2009/0145601 A1 | 6/2009 | Bailey | |
| 2009/0266543 A1 | 10/2009 | Reddy et al. | |
| 2009/0312445 A1 | 12/2009 | Roddy et al. | |
| 2009/0320720 A1 | 12/2009 | Roddy et al. | |
| 2010/0025039 A1 | 2/2010 | Roddy et al. | |
| 2010/0041792 A1 | 2/2010 | Roddy et al. | |
| 2010/0044057 A1 | 2/2010 | Dealy et al. | |
| 2010/0051266 A1 | 3/2010 | Roddy et al. | |
| 2010/0051275 A1 | 4/2010 | Lewis et al. | |
| 2010/0081584 A1 | 4/2010 | Perez | |
| 2010/0122816 A1 | 5/2010 | Lewis | |
| 2010/0273912 A1 | 10/2010 | Roddy et al. | |
| 2010/0292365 A1 | 11/2010 | Roddy et al. | |
| 2010/0294496 A1 | 11/2010 | Woytowich et al. | |
| 2011/0000400 A1 | 1/2011 | Roddy | |
| 2011/0017452 A1 | 1/2011 | Benkley | |
| 2011/0100626 A1 | 5/2011 | Brenneis et al. | |
| 2011/0297378 A1 | 12/2011 | Reddy et al. | |
| 2012/0145387 A1 | 6/2012 | Pyatina et al. | |
| 2012/0145393 A1 | 6/2012 | Roddy | |
| 2012/0152539 A1 | 6/2012 | Karcher | |
| 2012/0160131 A1 | 6/2012 | Roddy et al. | |
| 2012/0227631 A1 | 9/2012 | Roddy | |
| 2012/0234541 A1 | 9/2012 | Roddy | |
| 2012/0267107 A1 | 10/2012 | Benkley et al. | |
| 2012/0285682 A1 | 11/2012 | Santra et al. | |
| 2012/0291674 A1 | 11/2012 | Brenneis et al. | |
| 2012/0318506 A1 | 12/2012 | Benkley et al. | |
| 2012/0325119 A1 | 12/2012 | Brenneis et al. | |
| 2012/0325476 A1 | 12/2012 | Brenneis et al. | |
| 2012/0325477 A1 | 12/2012 | Brenneis et al. | |
| 2012/0328377 A1 | 12/2012 | Brenneis et al. | |
| 2013/0008351 A1 | 1/2013 | Roddy et al. | |
| 2013/0008352 A1 | 1/2013 | Roddy et al. | |
| 2013/0048286 A1 * | 2/2013 | Morgan | C04B 28/02 166/293 |
| 2013/0061779 A1 | 3/2013 | Brenneis et al. | |
| 2013/0112405 A1 | 5/2013 | Chatterji et al. | |
| 2013/0118752 A1 | 5/2013 | Hannegan et al. | |
| 2013/0126159 A1 | 5/2013 | Bryan et al. | |
| 2013/0157903 A1 | 6/2013 | Benkley et al. | |
| 2013/0213642 A1 | 8/2013 | Chatterji et al. | |
| 2013/0213643 A1 | 8/2013 | Chatterji et al. | |

(56) References Cited

U.S. PATENT DOCUMENTS

| | | |
|---|---|---|
| 2013/0233538 A1 | 9/2013 | Chatterji et al. |
| 2013/0244911 A1 | 9/2013 | Benkley et al. |
| 2014/0048266 A1 | 2/2014 | Morgan et al. |
| 2014/0060389 A1 | 3/2014 | Chatterji et al. |
| 2014/0076204 A1 | 3/2014 | Brenneis et al. |
| 2014/0123879 A1 | 5/2014 | Karcher et al. |

FOREIGN PATENT DOCUMENTS

| | | |
|---|---|---|
| CA | 2153372 | 1/2006 |
| CN | 1165849 | 11/1997 |
| CN | 1182062 | 5/1998 |
| EP | 0814067 | 12/1997 |
| EP | 1092693 | 4/2001 |
| EP | 1236701 | 9/2002 |
| EP | 1394137 | 7/2003 |
| EP | 1348831 | 10/2003 |
| EP | 1900703 | 3/2008 |
| EP | 2075303 | 7/2009 |
| GB | 1469954 | 4/1997 |
| GB | 2455446 | 6/2009 |
| JP | 52117316 | 10/1977 |
| JP | 10110487 | 4/1998 |
| RU | 2026959 | 1/1995 |
| RU | 2003136028 | 5/2005 |
| SU | 1373781 | 2/1988 |
| WO | WO 83/01443 | 9/1982 |
| WO | 93/21122 | 10/1993 |
| WO | WO 97/21637 | 6/1997 |
| WO | WO 98/54108 | 12/1998 |
| WO | WO 00/63134 | 1/2000 |
| WO | WO 03/031364 | 4/2003 |
| WO | WO 2004/101951 | 11/2004 |
| WO | WO 2004/101952 | 11/2004 |
| WO | WO 2005/047212 | 5/2005 |
| WO | WO 2005/061846 | 7/2005 |
| WO | WO 2006/032841 | 3/2006 |
| WO | WO 2007/028952 | 3/2007 |
| WO | WO 2007/041841 | 4/2007 |
| WO | WO 2007/048999 | 5/2007 |
| WO | WO 2007/128945 | 11/2007 |
| WO | 2009/071962 | 12/2007 |
| WO | 2006/074946 | 6/2009 |
| WO | WO 2009/138747 | 11/2009 |
| WO | 2010086592 | 8/2010 |
| WO | 2011051664 | 5/2011 |
| WO | 2012/001343 | 1/2012 |

OTHER PUBLICATIONS

Notice of Allowance from USPTO for U.S. Appl. No. 12/895,436 dated May 28, 2013.
Notice of Allowance from USPTO for U.S. Appl. No. 13/535,145 dated May 24, 2013.
Office Action from USPTO for U.S. Appl. No. 13/851,925 dated Jun. 6, 2013.
Office Action from USPTO for U.S. Appl. No. 13/851,391 dated Jul. 3, 2013.
Office Action from USPTO for U.S. Appl. No. 13/889,398 dated Jun. 20, 2013.
Office Action from USPTO for U.S. Appl. No. 13/872,063 dated Jul. 12, 2013.
Office Action from USPTO for U.S. Appl. No. 13/767,710 dated Jul. 19, 2013.
Notice of Allowance from USPTO for U.S. Appl. No. 13/851,391 dated Jul. 31, 2013.
Notice of Allowance from USPTO for U.S. Appl. No. 13/889,398 dated Aug. 20, 2013.
USPTO Notice of Allowance for U.S. Appl. No. 13/662,111 dated Oct. 21, 2013.
USPTO Final Office Action for U.S. Appl. No. 13/620,013 dated Oct. 2, 2013.
USPTO Final Office Action for U.S. Appl. No. 13/851,925 dated Sep. 20, 2013.
USPTO Office Action for U.S. Appl. No. 13/180,238 dated Sep. 25, 2013.
USPTO Final Office Action for U.S. Appl. No. 13/767,710 dated Sep. 20, 2013.
USPTO Office Action for U.S. Appl. No. 13/477,777 dated Sep. 20, 2013.
International Search Report and Written Opinion for PCT/US2013/056719 dated Oct. 25, 2013.
International Search Report and Written Opinion for PCT/US2013/048092 dated Nov. 13, 2013.
USPTO Notice of Allowance for U.S. Appl. No. 13/180,238 dated Jan. 22, 2014.
USPTO Notice of Allowance for U.S. Appl. No. 13/851,925 dated Jan. 24, 2014.
USPTO Office Action for U.S. Appl. No. 13/851,475 dated Jan. 24, 2014.
USPTO Office Action for U.S. Appl. No. 13/620,013 dated Jan. 30, 2014.
USPTO Office Action for U.S. Appl. No. 14/079,421 dated Jan. 30, 2014.
U.S. Appl. No. 13/872,063 (Chatterji et al.) filed Apr. 23, 2013.
U.S. Appl. No. 13/889,398 (Benkley et al.) filed May 8, 2013.
U.S. Appl. No. 13/872,063 (Chatterji et al.) filed Apr. 26, 2013.
Notice of Allowance, U.S. Appl. No. 13/669,149 (Brenneis et al.) dated May 13, 2013.
U.S. Appl. No. 13/767,710 (Benkley et al.) filed Feb. 14, 2013.
U.S. Appl. No. 13/851,391 (Chatterji et al.) filed Mar. 27, 2013.
U.S. Appl. No. 13/851,475 (Chatterji et al.) filed Mar. 27, 2013.
U.S. Appl. No. 13/851,925 (Chatterji et al.) filed Mar. 27, 2013.
U.S. Appl. No. 13/725,833 (Chatterji et al.) filed Dec. 21, 2012.
Office Action for U.S. Appl. No. 13/725,833 (Chatterji et al.) dated Apr. 10, 2013.
International Search Report and Written Opinion for PCT/US2013/057213 dated Nov. 18, 2013.
Office Action for Chinese Patent Application No. 200680042004.X dated Apr. 30, 2014, with English translation.
The Professional Standard of the People's Republic of China, "Rotary Kiln Dust Added to Cement" dated Oct. 25, 1994, ZB Q 12001-84, with English Translation.
International Search Report and Written Opinion for PCT/US2014/016756 dated Jun. 5, 2014.
Non-Final Official Action for U.S. Appl. No. 13/605,875 dated Jun. 24, 2015.
Non-Final Official Action for U.S. Appl. No. 13/598,052 dated Nov. 21, 2014.
Communication of the Board of Appeal from European Patent Office for European Application No. 06779194.7 dated May 10, 2016.
Herndon, "Setting Downhole Plugs: A State-of-the-Art", Petroleum Engineer International, Apr. 1978.
Morgan, R.G., Suter, D.A., and Sweat, V.A., "Mathematical Analysis of a Simple Back Extrusion Rheometer," ASAE Paper No. 79-6001, Jun. 24, 1979.
"API Specification for Materials and Testing for Well Cements", API Spec. 10, $5^{th}$ ed., pp. 7, 19-21, Jul. 1, 1980.
Sersale, "Portland-Zeolite-Cement for Minimizing Alkali-Aggregate Expansion", 1987.
Smith, "Cementing" Society of Professional Engineers, pp. 14, 38, 1987.
Smith, "Cementing" Society of Petroleum Engineers, p. 38, 1990.
Nelson, "Well Cementing", 1990.
Appendix A, API RP 132B-2, 2d ed.; pp. 6-8, Dec. 1, 1991.
Sugama, "Carbonation of Hydrothermally Treated Phosphate-Bonded Calcium Aluminate Cements", pp. 1-9, 1992.
Vinson, "Acid Removable Cement System Helps Lost Circulation in Productive Zones", IADC/SPE 23929, Feb. 1992.
Marfil, "Zeolite Crystallization in Portland Cement Concrete Due to Alkali-Aggregate Reaction", 1993.
Atkins, "Zeolite P in Cements", "Its Potential for Immobilizing Toxic and Radioactive Waste Species", 1995.

(56) References Cited

OTHER PUBLICATIONS

Janotka, "The Properties of Mortar Using Blends With Portland Cement Clinker, Zeolite Tuff and Gypsum", 1995.
Cobb et al., "Strength Enhancement of Concrete Containing MSW Incinerator Ash," Diviision of Fuel Chmistry American Chemical Society, vol. 40 No. 4, pp. 853-857, 1995.
"Manufacture of supplementary cementitious materials from cement kiln dust", Mishulovich et al., World Cement Research and Development, p. 116-120, Mar. 1996.
Sugama, "Hot Alkali Carbonation of Sodium Metaphosphate Modified Fly Ash/Calcium Aluminate Blend Hydrothermal Cements", pp. 1661-1672, Sep. 11, 1996.
Rogers, "Designing a Remedial Acid Treatment for Gulf of Mexico Deepwater Turbidite Sands Containing Zeolite Cement", 1996.
Cobb et al., "High-Strength Portland Cement Concrete Containing Municipal Solid Waste Incinerator Ash," ACS Symposium Series, vol. 515, pp. 1769-1776, 1996.
Janotka, "Effect of Bentonite and Zeolite on Durability of Cement Suspension Under Sulfate Attack", 1998.
Naiqian, "Study on the Suppression Effect of Natural Zeolite on Expansion of Concrete Due to Alkali-Aggregate Reaction", 1998.
"3M Scotchlite, Glass Bubbles Floated Product Series Product Information", 1999.
Chan, Comparative Study of the Initial Surface Absorption and Chloride Diffusion of High Performance Zeolite Silica Fume and PFA concretes, 1999.
Poon, "A Study of the Hydration of Natural Zeolite Blended Cement Pastes", 1999.
Ding, "Extreme Vertices Design of Concrete With Combined Mineral Admixtures", 1999.
James A. Kozinski et al., "Analysis of Hydrocarbons and Ash from Contaminated Industrial Biowaste Under Combustion-Like Conditions," Eviron. Sci. Technol., vol. 33, pp. 4318-4325, 1999.
Feng, "Zeolite Ceramiste Cellular Concrete", 2000.
Bartlet-Gouedard, "A Non-Conventional Way of Developing Cement Slurry for Geothermal Wells", 2001.
Jimmy et al., MSW Incineration Bottom Ash-Based Lightweight Concrete, pp. 1-5, 2003.
TXI Material Safety Data Sheet for PRESSUR-SEAL, Oct. 2003.
LaFarge MSDS "Cement Kiln Dust", Mar. 3, 2005.
LaFarge MSDS "LaFarge Blended Cement (Cement)", Mar. 3, 2005.
"Kiln Dusts", Apr. 14, 2005.
"Beneficial use of Solid Waste in Maine", Apr. 14, 2005.
"Standards for the Management of Cement Kiln Dust Waste", Apr. 14, 2005.
"Use of Cement Kiln Dust for the Stabilization of Soils", R. L. Parsons, et al., Apr. 14, 2005.
"Alkali-activated binders by use of industrial by-products", Buchwald et al., Cement and concrete Research 35, p. 968-973, 2005.
LaFarge brochure "TerraCem™", Aug. 2006.
Answer 3 of 24 Chemical Abstracts on STN "Effect of cement kiln dust substitution on chemical and physical properties and compressive strength of Portland and slag cements", Adb El-aleem et al. (abstract only), 2007.
Goyal et al., Agricultural Bio Waste Ashes as Alternate Cementitious Material—Strength Evaluation of Partially Blended Cement Mortars. pp. 1-2, 2007.
Adaska and Taubert, "Beneficial Uses of Cement Kiln Dust", 2008 IEEE/PCA 50th Cement Industry Technical Conference, Miami, FL, pp. 1-19, May 19, 2008.
"Fly Ash Resource Center—Pozzolan," available at http://www.rmajko.com/pozzolan.htm, Apr. 20, 2009.
Suyan, "An Innovative Material for Severe Lost Circulation Control in Depleted Formations" SPE/IADC 125693, Oct. 2009.
M. Nazir et al., Waste Ash Pozzolans, http://iirr.ucalgary.ca/files/iirr/waste_ash_slides.pdf, pp. 1-21, Printed from the Internet Jul. 12, 2009.
HES Brochure "SCR-100 Cement Retarder A Valuable Time Saver", 1994.
HES Brochure "Halad-344 Fluid Loss Additive", 1998.
HES Brochure "HR-5 Cement Additive", 1998.
HES Brochure "AQF-2 Foaming Agent", 1999.
HES Brochure "ThermaLock™ Cement for Corrosive $CO_2$ Environments", 1999.
HES Brochure "Halad-413 Fluid Loss Additive", 1999.
HES Brochure "Howco Suds Surfactant", 1999.
HES Brochure "HR-12 Cement Retarder", 1999.
HES Brochure "HR-15 Cement Retarder", 1999.
HES Brochure "HR-25 Cement Retarder", 1999.
HES Brochure "HR-4 Cement Retarder", 1999.
HES Brochure "HR-7 Cement Retarder", 1999.
HES Brochure "Pozmix A Cement Additive", 1999.
HES Brochure "Pozmix Cement and Pozmix 140", 1999.
HES Brochure "SCR-100 Cement Retarder", 1999.
HES Brochure "SCR-500L High Temp Retarder", 2000.
HES Brochure "Halad-23 Fluid Loss Additive", 2000.
HES Brochure "Thermatek Service", May 2005.
HES Brochure "Tuned Spacer™ III", Apr. 2007.
HES Brochure "Econolite™ Additive for Cement Slurries", Aug. 2007.
HES Brochure "SSA-1™ Strength-Stabilizing Agent", Aug. 2007.
HES Brochure "SSA-2™ Coarse Silica Flour", Aug. 2007.
BASF Technical Bulletin "MetaMax® PA", Aug. 2007.
HES Brochure "Silicalite™", Aug. 2007.
HES Brochure "SCR-100™ Cement Retarder", Aug. 2007.
HESS Pumice Products Inc., Fact Sheet for "DS-200", "DS-325", and "Ultrafine Grout", Aug. 2007.
HES Brochure "Cal-Seal 60™ Cement Accelerator", Aug. 2007.
HES Brochure "WG-17 LXP™ Free-Water Control Agent", Dec. 2007.
HES Brochure "HR® -601 Cement Retarder", Jan. 2008.
HES Brochure "Thermatek® RSP Rapid Set Plug Service", Mar. 2008.
HES Product Data Sheet "Baroid®", Mar. 25, 2010.
HES Brochure "Enhancer 923™ Cement Agent" (undated but admitted as prior art), Jun. 2010.
HES Brochure "Enhancer 923™ Agent—Successes from the Field", Jun. 2010.
HES Brochure "Latex 3000™ Cement Additive", Jun. 2010.
HES Brochure "Foamer 760™ Foamer/Stabilizer", Aug. 2010.
HES Brochure Tuned® Spacer IV, Aug. 2010.
HES Brochure "Tuned® Spacer V", Dec. 2010.
HES Brochure "D-Air 5000™ Defoamer", Aug. 2011.
HES Brochure "SA-1015™ Suspending Agent", Mar. 2012.
HES Brochure "WellLife® III Cementing Service", Jan. 2012.
Office Action from U.S. Appl. No. 11/223,671, dated Dec. 15, 2005.
Office Action from U.S. Appl. No. 11/271,431, dated Mar. 6, 2006.
Office Action from U.S. Appl. No. 11/223,671, dated Mar. 31, 2006.
Office Action from U.S. Appl. No. 11/271,431, dated May 17, 2006.
Office Action from U.S. Appl. No. 11/271,431 (Advisory Action), dated Jul. 11, 2006.
Office Action from U.S. Appl. No. 11/416,563, dated Jul. 21, 2006.
Office Action from U.S. Appl. No. 11/403,032, dated Jul. 24, 2006.
Office Action from U.S. Appl. No. 11/271,431, dated Aug. 15, 2006.
Office Action from U.S. Appl. No. 11/440,627, dated Aug. 21, 2006.
Office Action from U.S. Appl. No. 11/402,741, dated Oct. 19, 2006.
Office Action from U.S. Appl. No. 11/484,951, dated Oct. 26, 2006.
Office Action from U.S. Appl. No. 11/484,951, dated Dec. 21, 2006.
Office Action from U.S. Appl. No. 11/223,703, dated Jan. 17, 2007.
Office Action from U.S. Appl. No. 11/402,741, dated Feb. 2, 2007.
Office Action from U.S. Appl. No. 11/223,485, dated Feb. 28, 2007.
Office Action from U.S. Appl. No. 11/223,669, dated Feb. 28, 2007.
Office Action from U.S. Appl. No. 11/271,690, dated Mar. 13, 2007.
Office Action from U.S. Appl. No. 11/402,741, dated Mar. 22, 2007.
Office Action from U.S. Appl. No. 11/223,703, dated Apr. 25, 2007.
Office Action from U.S. Appl. No. 11/402,741, dated May 29, 2007.
Office Action from U.S. Appl. No. 11/223,669, dated Jun. 18, 2007.
Office Action from U.S. Appl. No. 11/257,261, dated Aug. 10, 2007.
Office Action from U.S. Appl. No. 11/402,741, dated Sep. 6, 2007.
Office Action from U.S. Appl. No. 11/223,669, dated Oct. 9, 2007.

(56) References Cited

OTHER PUBLICATIONS

Office Action from U.S. Appl. No. 11/223,750, dated Oct. 16, 2007.
Office Action from U.S. Appl. No. 11/402,741, dated Oct. 24, 2007.
Office Action from U.S. Appl. No. 11/223,669, dated Jan. 29, 2008.
Office Action from U.S. Appl. No. 11/223,669, dated Apr. 8, 2008.
Office Action from U.S. Appl. No. 12/263,800, dated May 1, 2009.
Office Action from U.S. Appl. No. 12/283,398, dated Jul. 15, 2009.
Office Action from U.S. Appl. No. 12/263,800, dated Jul. 28, 2009.
Office Action from U.S. Appl. No. 12/420,630, dated Aug. 3, 2009.
Office Action from U.S. Appl. No. 12/349,676, dated Nov. 4, 2009.
Office Action from U.S. Appl. No. 12/606,381, dated Mar. 23, 2010.
Office Action from U.S. Appl. No. 12/609,993, dated Apr. 9, 2010.
Office Action from U.S. Appl. No. 12/609,993, dated Jun. 15, 2010.
Office Action from U.S. Appl. No. 12/558,097, dated Jun. 30, 2010.
Notice of Allowance from U.S. Appl. No. 12/609,993, dated Jul. 26, 2010.
Office Action from U.S. Appl. No. 12/588,097, dated Sep. 3, 2010.
Office Action from U.S. Appl. No. 12/844,612, dated Oct. 1, 2010.
Office Action from U.S. Appl. No. 12/833,189, dated Oct. 1, 2010.
Office Action from U.S. Appl. No. 12/844,612, dated Jan. 28, 2011.
Notice of Allowance for U.S. Appl. No. 12/544,915, dated Aug. 1, 2011.
Office Action from U.S. Appl. No. 12/844,612, dated Sep. 6, 2011.
Office Action from U.S. Appl. No. 12/497,402, dated Feb. 27, 2012.
Final Office Action from U.S. Appl. No. 12/264,010, dated Apr. 10, 2012.
Office Action from U.S. Appl. No. 12/844,612, dated Apr. 11, 2012.
Office Action from U.S. Appl. No. 13/399,913, dated May 15, 2012.
Office Action from U.S. Appl. No. 13/447,560, dated May 31, 2012.
Office Action from U.S. Appl. No. 12/821,412, dated Jun. 5, 2012.
Office Action from U.S. Appl. No. 12/825,004, dated Jun. 14, 2012.
Office Action from U.S. Appl. No. 13/447,560, dated Jun. 21, 2012.
Office Action from U.S. Appl. No. 13/418,220, dated Jun. 27, 2012.
Office Action from U.S. Appl. No. 12/497,402, dated Jun. 27, 2012.
Office Action from U.S. Appl. No. 13/479,476, dated Jul. 2, 2012.
Office Action from U.S. Appl. No. 12/975,196, dated Jul. 3, 2012.
Office Action from U.S. Appl. No. 12/844,612, dated Jul. 30, 2012.
Notice of Allowance from U.S. Appl. No. 13/399,913, dated Aug. 23, 2012.
Notice of Allowance from U.S. Appl. No. 13/535,258, dated Sep. 7, 2012.
Notice of Allowance from U.S. Appl. No. 13/825,004, dated Sep. 20, 2012.
Office Action from U.S. Appl. No. 13/477,777, dated Oct. 15, 2012.
Office Action from U.S. Appl. No. 13/560,406, dated Oct. 17, 2012.
Notice of Allowance from U.S. Appl. No. 13/844,612, dated Oct. 18, 2012.
Office Action for U.S. Appl. No. 13/555,624, dated Oct. 19, 2012.
Final Office Action from U.S. Appl. No. 12/975,196, dated Oct. 23, 2012.
Final Office Action from U.S. Appl. No. 13/418,220, dated Oct. 25, 2012.
Office Action from U.S. Appl. No. 12/497,402, dated Oct. 25, 2012.
Office Action from U.S. Appl. No. 13/431,701, dated Nov. 9, 2012.
Office Action from U.S. Appl. No. 13/620,163, dated Nov. 9, 2012.
Office Action from U.S. Appl. No. 13/606,098, dated Dec. 13, 2012.
Office Action from U.S. Appl. No. 13/669,149, dated Dec. 19, 2012.
Office Action from U.S. Appl. No. 12/497,402, dated Feb. 7, 2013.
Office Action from U.S. Appl. No. 13/620,013, dated Feb. 26, 2013.
Foreign Search Report from PCT/GB2005/001415, dated Sep. 9, 2005.
Foreign Search Report from PCT/GB2006/000406, dated Jul. 5, 2006.
Foreign Search Report from PCT/GB2006/003163, dated Oct. 27, 2006.
Foreign Search Report from PCT/GB2006/003160, dated Nov. 2, 2006.
Foreign Search Report from PCT/GB2006/003735, dated Dec. 1, 2006.
Foreign Search Report from PCT/GB2006/003694, dated Dec. 19, 2006.
Foreign Search Report from PCT/GB2006/000401, dated May 8, 2007.
PCT International Search Report and Written Opinion for International Application No. PCT/GB2009/000295, dated Jul. 30, 2009.
PCT International Search Report and Written Opinion for International Application No. PCT/GB2009/002597, dated Feb. 1, 2010.
PCT International Search Report and Written Opinion for International Application No. PCT/GB2009/002598, dated Feb. 11, 2010.
PCT International Search Report and Written Opinion for International Application No. PCT/GB2010/000712, dated Jul. 26, 2010.
PCT International Preliminary Report on Patentability for International Application No. PCT/GB2009/000295, dated Aug. 24, 2010.
PCT International Search Report and Written Opinion for International Application No. PCT/GB2010/001986, dated Jan. 19, 2011.
PCT International Search Report and Written Opinion for International Application No. PCT/GB2010/002011, dated Feb. 4, 2011.
PCT International Preliminary Report on Patentability for International Application No. PCT/GB2009/002018, dated Mar. 24, 2011.
PCT International Search Report and Written Opinion for International Application No. PCT/GB2011/000933, dated Sep. 22, 2011.
PCT International Search Report and Written Opinion for International Application No. PCT/G82011/001411, dated Jan. 27, 2012.
PCT International Search Report for International Application No. PCT/GB2011/001749, dated Apr. 5, 2012.
PCT International Search Report and Written Opinion for International Application No. PCT/US2012/046117, dated Oct. 26, 2012.
Foreign Office Action for Canadian Patent Application No. 2621835, dated Oct. 2, 2009.
Foreign Office Action for Canadian Patent Application No. 2621832, dated Oct. 5, 2009.
Foreign Office Action for Canadian Patent Application No. 2650630, dated Oct. 14, 2010.
Foreign Office Action for Canadian Patent Application No. 2658155, dated Nov. 16, 2010.
Foreign Office Action for Canadian Patent Application No. 2736148, dated May 29, 2012.
Foreign Office Action for CN Application No. 200680042004.X, dated May 12, 2010.
Foreign Office Action for EP Application No. 06 794 648.3, dated Apr. 17, 2009.
Foreign Office Action for EP Application No. 06 779 194.7, dated May 29, 2009.
Foreign Office Action for EP Application No. 06 779 199.6, dated Mar. 1, 2010.
Foreign Office Action for EP Application No. 06 779 191.3, dated Mar. 31, 2010.
Foreign Office Action for EP Application No. 06 779 194.7, dated Jul. 2, 2010.
Foreign Office Action for EP Application No. 06 794 646.7, dated Sep. 24, 2010.
Foreign Office Action for EP Application No. 09 713 469.6, dated Sep. 28, 2010.
Foreign Office Action for RU Application No. 2008113766, dated Jul. 14, 2009.
Foreign Office Action for RU Application No. 2008113766, dated Apr. 8, 2010.
Foreign Office Action for RU Application No. 2008113765, dated Jul. 6, 2009.
English language translation of Foreign Office Action for Chinese Application No. 200680042014.3, dated Dec. 1, 2010.
U.S. Appl. No. 13/622,821, dated Sep. 19, 2012.
U.S. Appl. No. 13/725,833, dated Dec. 21, 2012.
U.S. Appl. No. 13/767,710, dated Feb. 14, 2013.

\* cited by examiner

COMPOSITIONS CONTAINING KILN DUST AND/OR BIOWASTE ASH AND METHODS OF USE

CROSS-REFERENCE TO RELATED APPLICATIONS

This application is a continuation-in-part of U.S. application Ser. No. 13/725,833, entitled "Consolidating Spacer Fluids and Methods of Use," filed on Dec. 21, 2012, which is a continuation-in-part of U.S. application Ser. No. 13/535,145, entitled "Foamed Spacer Fluids Containing Cement Kiln Dust and Methods of Use," filed on Jun. 27, 2012, which is a continuation-in-part of U.S. application Ser. No. 12/895,436, entitled "Spacer Fluids Containing Cement Kiln Dust and Methods of Use," filed on Sep. 30, 2010, which is a continuation-in-part of U.S. application Ser. No. 12/264,010 (now U.S. Pat. No. 8,333,240), entitled "Reduced Carbon Footprint Sealing Compositions for Use in Subterranean Formations," filed on Nov. 3, 2008, which is a continuation-in-part of U.S. application Ser. No. 11/223,669 (now U.S. Pat. No. 7,445,669), entitled "Settable Compositions Comprising Cement Kiln Dust and Additive(s)," filed Sep. 9, 2005, the entire disclosures of which are incorporated herein by reference, and this application is also a continuation-in-part of U.S. application Ser. No. 12/497,402, entitled "Well Cement Compositions Comprising Biowaste Ash and Methods of Use," filed on Jul. 2, 2009, the entire disclosure of which is incorporated herein by reference.

BACKGROUND

The present invention relates to subterranean operations and, more particularly, in certain embodiments, to treatment fluids comprising biowaste ash and/or kiln dust and their respective methods of use in subterranean formations.

Large amounts of biowaste are generated worldwide each year. Biowaste ash is derived from a number of sources including agricultural waste, municipal waste, waste-water treatment waste, animal waste, non-human-non-animal industrial waste, and combinations thereof. A number of different methods for disposal of biowaste have been developed, including application to surface land, composting, and landfill disposal. In addition, billions of tons of biowaste are burnt every year, resulting in tons of ashes that must be disposed.

During the manufacture of cement, a waste material commonly referred to as cement kiln dust ("CKD") is generated. The term "CKD" is used herein to mean cement kiln dust as described herein and equivalent forms of cement kiln dust made in other ways. CKD, as that term is used herein, typically refers to a partially calcined kiln feed which is removed from the gas stream and collected, for example, in a dust collector during the manufacture of cement. Usually, large quantities of CKD are collected in the production of cement that are commonly disposed of as waste. Disposal of the waste CKD can add undesirable costs to the manufacture of the cement, as well as the environmental concerns associated with its disposal. The chemical analysis of CKD from various cement manufactures varies depending on a number of factors, including the particular kiln feed, the efficiencies of the cement production operation, and the associated dust collection systems. CKD generally may comprise a variety of oxides, such as $SiO_2$, $Al_2O_3$, $Fe_2O_3$, $CaO$, $MgO$, $SO_3$, $Na_2O$, and $K_2O$.

Spacer fluids are often used in subterranean operations to facilitate improved displacement efficiency when introducing new fluids into a well bore. For example, a spacer fluid can be used to displace a fluid in a well bore before introduction of another fluid. When used for drilling fluid displacement, spacer fluids can enhance solids removal as well as separate the drilling fluid from a physically incompatible fluid. For instance, in primary cementing operations, the spacer fluid may be placed into the well bore to separate the cement composition from the drilling fluid. Spacer fluids may also be placed between different drilling fluids during drilling change outs or between a drilling fluid and a completion brine, for example. In some instances, at least a portion of the spacer fluid may be left in the well bore annulus.

To be effective, the spacer fluid can have certain characteristics. For example, the spacer fluid may be compatible with the drilling fluid and the cement composition. This compatibility may also be present at downhole temperatures and pressures. In some instances, it is also desirable for the spacer fluid to leave surfaces in the well bore water wet, thus facilitating bonding with the cement composition. Rheology of the spacer fluid can also be important. A number of different rheological properties may be important in the design of a spacer fluid, including yield point, plastic viscosity, gel strength, and shear stress, among others.

Cement compositions may be used in a variety of subterranean operations. For example, in subterranean well construction, a pipe string (e.g., casing, liners, expandable tubulars, etc.) may be run into a well bore and cemented in place. The process of cementing the pipe string in place is commonly referred to as "primary cementing." In a typical primary cementing method, a cement composition may be pumped into an annulus between the walls of the well bore and the exterior surface of the pipe string disposed therein. The cement composition may set in the annular space, thereby forming an annular sheath of hardened, substantially impermeable cement (i.e., a cement sheath) that may support and position the pipe string in the well bore and may bond the exterior surface of the pipe string to the subterranean formation. Among other things, the cement sheath surrounding the pipe string functions to prevent the migration of fluids in the annulus, as well as protecting the pipe string from corrosion. Cement compositions also may be used in remedial cementing methods, for example, to seal cracks or holes in pipe strings or cement sheaths, to seal highly permeable formation zones or fractures, to place a cement plug, and the like.

SUMMARY

The present invention relates to subterranean operations and, more particularly, in certain embodiments, to treatment fluids comprising biowaste ash and their respective methods of use in subterranean formations.

The present invention relates to subterranean operations and, more particularly, in certain embodiments, to treatment fluids comprising biowaste ash and kiln dust and their respective methods of use in subterranean formations.

An embodiment of the present invention comprises a method of treating a subterranean formation comprising: providing a treatment fluid comprising a kiln dust, biowaste ash, and water; and introducing the treatment fluid into a subterranean formation.

Another embodiment of the present invention comprises a method of cementing comprising: introducing a cement composition into a subterranean formation, wherein the cement composition comprises a kiln dust, biowaste ash, and water; and allowing the cement composition to set in the subterranean formation.

Another embodiment of the present invention comprises a method comprising: providing a spacer fluid comprising biowaste ash and water; introducing the spacer fluid into a well bore to displace at least a portion of a first fluid from the well bore; and introducing a cement composition into the well bore, wherein the spacer fluid separates the cement composition and the first fluid.

Yet another embodiment of the present invention comprises a composition for a subterranean treatment fluid comprising: a kiln dust, biowaste ash, and water.

The features and advantages of the present invention will be readily apparent to those skilled in the art. While numerous changes may be made by those skilled in the art, such changes are within the spirit of the invention.

DESCRIPTION OF PREFERRED EMBODIMENTS

Embodiments relate to spacer fluid compositions comprising biowaste ash and/or kiln dust and methods of use in subterranean formations and, more particularly, in certain embodiments, to compositions and methods that use biowaste ash and kiln dust for enhancing one or more rheological properties of a spacer fluid. Embodiments also relate to using biowaste ash and kiln dust in cement compositions to enhance the compressive strength, rheology, density, and cost reduction.

There may be several potential advantages to the methods and compositions of the present invention, only some of which may be alluded to herein. One of the many potential advantages of the methods and compositions of the present invention is that the biowaste ash and CKD may be used in spacer fluids as a rheology modifier allowing formulation of a spacer fluid with desirable rheological properties. Another potential advantage of the methods and compositions of the present invention is that inclusion of the biowaste ash and CKD in the consolidated spacer fluids may result in a spacer fluid without undesired thermal thinning. In addition to use in spacer fluids, there may also be advantages to the inclusion of CKD and also biowaste ash in cement compositions. For example, one of the many potential advantages of the methods and compositions of the present invention's cement embodiments may be that the inclusion of the biowaste ash and CKD may reduce the amount of a higher cost additive, such as Portland cement, resulting in a more economical cement composition. Yet another potential advantage of the methods and compositions of the cement embodiments may be that inclusion of the biowaste ash and CKD in embodiments of the cement compositions may enhance mechanical properties of the cement compositions, including, for example, compressive strength. Another potential advantage of the methods and compositions of all embodiments may be that inclusion of the biowaste ash and CKD in embodiments of the cement compositions provides an additional method for the disposal of these materials.

Example Spacer Fluid

Embodiments of the spacer fluids of the present invention may comprise water and biowaste ash. Embodiments of the spacer fluids of the present invention may comprise water, biowaste ash, and CKD. In some embodiments, the spacer fluids may be foamed. In some embodiments, the spacer fluids may be consolidating. In accordance with present embodiments, the spacer fluid may be used to displace a first fluid from a well bore with the spacer fluid having a higher yield point than the first fluid. For example, the spacer fluid may be used to displace at least a portion of a drilling fluid from the well bore. Other optional additives may also be included in embodiments of the spacer fluids as desired for a particular application. For example, the spacer fluids may further comprise viscosifying agents, organic polymers, dispersants, surfactants, weighting agents, and any combination thereof.

The spacer fluids generally should have a density suitable for a particular application as desired by those of ordinary skill in the art, with the benefit of this disclosure. In some embodiments, the spacer fluids may have a density in the range of about 8 pounds per gallon ("ppg") to about 24 ppg. In other embodiments, the spacer fluids may have a density in the range of about 8 ppg to about 14 ppg. In yet other embodiments, the spacer fluids may have a density in the range of about 10 ppg to about 12 ppg.

The water used in an embodiment of the spacer fluids may include, for example, freshwater, saltwater (e.g., water containing one or more salts dissolved therein), brine (e.g., saturated saltwater produced from subterranean formations), seawater, or any combination thereof. Generally, the water may be from any source, provided that the water does not contain an excess of compounds that may undesirably affect other components in the spacer fluid. The water is included in an amount sufficient to form a pumpable spacer fluid. In some embodiments, the water may be included in the spacer fluids in an amount in the range of about 15% to about 95% by weight of the spacer fluid. In other embodiments, the water may be included in the spacer fluids of the present invention in an amount of about 25% to about 85% by weight of the spacer fluid. One of ordinary skill in the art, with the benefit of this disclosure, will recognize the appropriate amount of water to include for a chosen application.

As set forth above, biowaste ash may be included in the spacer fluids. The biowaste ash may be included in the spacer fluids in an amount sufficient to provide, for example, the desired rheological properties. In some embodiments, the biowaste ash may be present in the spacer fluids in an amount in the range of about 1% to about 65% by weight of the spacer fluid (e.g., about 1%, about 5%, about 10%, about 15%, about 20%, about 25%, about 30%, about 35%, about 40%, about 45%, about 50%, about 55%, about 60%, about 65%, etc.). In some embodiments, the biowaste ash may be present in the spacer fluids in an amount in the range of about 5% to about 60% by weight of the spacer fluid. Alternatively, the biowaste ash may be present in embodiments of the spacer fluids of the present invention in an amount of about 0.1% to about 100% by weight of cementitious components ("bwoc") present in the spacer fluid. For example, the biowaste ash may be present in an amount of about 0.1%, about 5%, about 10%, about 20%, about 30%, about 40%, about 50%, about 60%, about 70%, about 80%, about 90%, about 99%, or about 100% bwoc. The term "by weight of cementitious components" or "bwoc" refers to the amount of a particular component by weight of cementitious components, i.e., the component or combination of components that hydraulically set, or otherwise harden, to develop compressive strength, including, for example, CKD, biowaste ash, Portland cement, fly ash, natural pozzolans (e.g., pumicite), slag, and the like. One of ordinary skill in the art, with the benefit of this disclosure, will recognize the appropriate amount of biowaste ash to include for a chosen application.

The biowaste ash may be included in embodiments of the consolidated spacer fluids as a rheology modifier, for example. Among other things, it is believed that using biowaste ash in embodiments of the present invention can provide spacer fluids having rheology suitable for a particular application. Desirable rheology may be advantageous to provide a spacer fluid that is effective for drilling fluid displacement, for example.

Biowaste ash is generally biowaste that has been burned to produce ash and includes plant- and/or animal-derived waste products. As previously described, the biowaste and/or biowaste ash is often disposed of as a waste, but may include any ash that is specifically produced from the sources described herein for use in the various embodiments of the invention. However, in accordance with embodiments of the present invention, the biowaste ash may be used as described herein. In certain embodiments, the ashes produced from the burning of biowaste can be used as a filler material in cementing and spacer fluid operations.

Any biowaste that can be burned to produce ash that may be useful in spacer fluids may be suitable for use in embodiments of the present invention. Examples of suitable biowaste ash that may be suitable for use include, for example, agricultural waste ash, municipal waste ash, waste-water treatment waste ash, animal waste ash, non-human-non-animal industrial waste ash, and combinations thereof. The agricultural waste ash, municipal waste ash and industrial waste ash may also include ash that is derived from agricultural, municipal or industrial materials that have viable other uses and are not necessarily considered to be a waste products. The biowaste ash may also be generated, for example, as a byproduct of combustion for heat and/or power generation. Examples of agricultural waste ash that may be used in embodiments of the present invention include, for example, wood (e.g., sawdust, bark, twigs, branches, other waste wood) ash, tree leave ash, corn cob ash, rice hull ash, cane (e.g., sugar cane) ash, bagasse ash, grain (e.g., amaranth, barley, corn flaxseed, millet, oat, quinoa, rye, rice, wheat etc.) and related by-product(s) (e.g., husks, hulls, etc.) ash, orchard ash, vine trimming ash, grass (e.g., Korai, Tifton, native shiba, etc.) ash, straw ash, ground nut shell ash, legume (e.g., soybean) ash, and combinations thereof. Municipal waste ashes that may be useful in embodiments of the present invention include municipal solid waste ashes and municipal sewage waste ashes, including, for example, human biowaste ash, food waste ash, household scrap ash, sanitary paper product ash, and ashes of other biological components. Municipal sewage waste also may comprise mineral matter and small amounts of chemical products that can be introduced, for example, into the waste stream through a municipal sewer system. Animal waste ashes that may be used in embodiments of the present invention include, for example, ashes derived from burning manure and other animal wastes that may be generated at sites where animals are raised or housed. Other biowaste ashes, such as non-human-non-animal industrial waste ashes that may be used in embodiments of the present invention include, for example, ashes derived from pulp and paper mill sludge, waste oil products including greases and solids, and wastes that include organic debris dredged from harbors or estuaries. In some embodiments, the spacer fluids may be free or essentially free of rice Burn duration and burn temperature, for example, may impact the composition of the ash obtained from the biowaste. The burn temperature, as used herein, refers to the temperature at which the biowaste is exposed during the burning and not to the temperature of the biowaste itself. It should be understood that the biowaste may be burned at a wide variety of times and temperatures to produce ash suitable for use in embodiments of the present invention. By way of example, the biowaste may be burned for about 2 hours to about 8 hours and, alternatively, for about 3 hours to about 6 hours. In certain embodiments, the biowaste may be burned for about 5 hours. By way of further example, the ash may be burned at a temperature of about 400° C. to about 900° C. and, alternatively, of about 500° C. to about 700° C. In certain embodiments, the ash may be burned at a temperature of about 600° C. It should be understand that burn times and burn temperatures outside those listed in this disclosure may also be suitable for embodiments of the present invention.

As set forth above, CKD may be included in the spacer fluids. The CKD may be included in the consolidated spacer fluids in an amount sufficient to provide, for example, the desired rheological properties. In some embodiments, the CKD may be present in the spacer fluids in an amount in the range of about 1% to about 65% by weight of the spacer fluid (e.g., about 1%, about 5%, about 10%, about 15%, about 20%, about 25%, about 30%, about 35%, about 40%, about 45%, about 50%, about 55%, about 60%, about 65%, etc.). In some embodiments, the CKD may be present in the spacer fluids in an amount in the range of about 5% to about 60% by weight of the spacer fluid. Alternatively, the CKD may be present in embodiments of the spacer fluids of the present invention in an amount of about 0.1% to about 99% bwoc. For example, the CKD may be present in an amount of about 0.1%, about 5%, about 10%, about 20%, about 30%, about 40%, about 50%, about 60%, about 70%, about 80%, about 90%, or about 99% bwoc. One of ordinary skill in the art, with the benefit of this disclosure, will recognize the appropriate amount of CKD to include for a chosen application.

While the preceding description describes CKD, the present invention is broad enough to encompass the use of other partially calcined kiln feeds. The present invention may comprise any partially calcined kiln feed removed from a gas stream comprising $SiO_2$, $Al_2O_3$, $Fe_2O_3$, CaO, MgO, $SO_3$, $Na_2O$, and $K_2O$. For example, embodiments of the spacer fluids may comprise lime kiln dust, which is a material that is generated during the manufacture of lime. The term lime kiln dust typically refers to a partially calcined kiln feed which can be removed from the gas stream and collected, for example, in a dust collector during the manufacture of lime. The chemical analysis of lime kiln dust from various lime manufactures varies depending on a number of factors, including the particular limestone or dolomitic limestone feed, the type of kiln, the mode of operation of the kiln, the efficiencies of the lime production operation, and the associated dust collection systems. Lime kiln dust generally may comprise varying amounts of free lime and free magnesium, lime stone, and/or dolomitic limestone and a variety of oxides, such as $SiO_2$, $Al_2O_3$, $Fe_2O_3$, CaO, MgO, $SO_3$, $Na_2O$, and $K_2O$, and other components, such as chlorides.

As previously mentioned, embodiments of the consolidated spacer fluids may be foamed with a gas, for example, to provide a consolidated spacer fluid with a reduced density. It should be understood that reduced densities may be needed for embodiments of the consolidated spacer fluids to more approximately match the density of a particular drilling fluid, for example, where lightweight drilling fluids are being used. A drilling fluid may be considered lightweight if it has a density of less than about 13 ppg, alternatively, less than about 10 ppg, and alternatively less than about 9 ppg. In some embodiments, the consolidated spacer fluids may be foamed to have a density within about 10% of the density of the drilling fluid and, alternatively, within about 5% of the density of the drilling fluid. While techniques, such as lightweight additives, may be used to reduce the density of the spacer fluids comprising CKD and biowaste ash without foaming, these techniques may have drawbacks. For example, reduction of the consolidated spacer fluid's density to below about 13 ppg using lightweight additives may produce unstable slurries, which can have problems with settling of solids, floating of lightweight additives, and free water, among others. Accordingly, the consolidated spacer fluid may be foamed to provide a consolidated spacer fluid having a reduced density that is more stable.

Therefore, in some embodiments, the spacer fluids may be foamed and comprise water, biowaste ash, CKD, a foaming agent, and a gas. Optionally, to provide a spacer fluid with a lower density and more stable foam, the foamed consolidated spacer fluid may further comprise a lightweight additive, for example. With the lightweight additive, a base slurry may be prepared that may then be foamed to provide an even lower density. In some embodiments, the foamed spacer fluid may have a density in the range of from about 4 ppg to about 13 ppg and, alternatively, about 7 ppg to about 9 ppg. In one particular embodiment, a base slurry may be foamed from a density of in the range of from about 9 ppg to about 13 ppg to a lower density, for example, in a range of from about 7 ppg to about 9 ppg.

The gas used in embodiments of the foamed consolidated spacer fluids may be any suitable gas for foaming the consolidated spacer fluid, including, but not limited to air, nitrogen, and combinations thereof. Generally, the gas should be present in embodiments of the foamed consolidated spacer fluids in an amount sufficient to form the desired foam. In certain embodiments, the gas may be present in an amount in the range of from about 5% to about 80% by volume of the foamed consolidated spacer fluid at atmospheric pressure, alternatively, about 5% to about 55% by volume, and, alternatively, about 15% to about 30% by volume.

Where foamed, embodiments of the spacer fluids may comprise a foaming and stabilizing surfactant composition. As used herein, a "foaming and stabilizing surfactant composition" refers to a composition that comprises one or more surfactants and, among other things, may be used to facilitate the foaming of a spacer fluid and also may stabilize the resultant foamed spacer fluid formed therewith. Examples of suitable foaming and stabilizing surfactant composition may include, but are not limited to: mixtures of an ammonium salt of an alkyl ether sulfate, a cocoamidopropyl betaine surfactant, a cocoamidopropyl dimethylamine oxide surfactant, sodium chloride, and water; mixtures of an ammonium salt of an alkyl ether sulfate surfactant, a cocoamidopropyl hydroxysultaine surfactant, a cocoamidopropyl dimethylamine oxide surfactant, sodium chloride, and water; hydrolyzed keratin; mixtures of an ethoxylated alcohol ether sulfate surfactant, an alkyl or alkene amidopropyl betaine surfactant, and an alkyl or alkene dimethylamine oxide surfactant; aqueous solutions of an alpha-olefinic sulfonate surfactant and a betaine surfactant; and combinations thereof. An example of a suitable foaming and stabilizing surfactant composition is FOAMER™ 760 foamer/stabilizer, available from Halliburton Energy Services, Inc. Suitable foaming and stabilizing surfactant composition are described in U.S. Pat. Nos. 6,797,054, 6,547,871, 6,367,550, 6,063,738, and 5,897,699, the entire disclosures of which are incorporated herein by reference.

Generally, the foaming and stabilizing surfactant composition may be present in embodiments of the foamed spacer fluids in an amount sufficient to provide suitable foam. In some embodiments, the foaming and stabilizing surfactant composition may be present in an amount in the range of from about 0.8% to about 5% by volume of the water ("bvow").

Optionally, embodiments of the consolidating spacer fluids may further comprise fly ash. A variety of fly ashes may be suitable, including fly ash classified as Class C or Class F fly ash according to American Petroleum Institute, *API Specification for Materials and Testing for Well Cements*, API Specification 10, Fifth Ed., Jul. 1, 1990. Suitable examples of fly ash include, but are not limited to, POZ-MIX® A cement additive, commercially available from Halliburton Energy Services, Inc., Duncan, Okla. Where used, the fly ash generally may be included in the spacer fluids in an amount desired for a particular application. In some embodiments, the fly ash may be present in the spacer fluids in an amount in the range of about 1% to about 60% by weight of the spacer fluid (e.g., about 5%, about 10%, about 15%, about 20%, about 25%, about 30%, about 35%, about 40%, about 45%, about 50%, about 55%, etc.). In some embodiments, the fly ash may be present in the spacer fluids in an amount in the range of about 1% to about 35% by weight of the spacer fluid. In some embodiments, the fly ash may be present in the spacer fluids in an amount in the range of about 1% to about 10% by weight of the spacer fluid. One of ordinary skill in the art, with the benefit of this disclosure, will recognize the appropriate amount of the fly ash to include for a chosen application.

Optionally, embodiments of the spacer fluids may further comprise a free water control additive. As used herein, the term "free water control additive" refers to an additive included in a liquid for, among other things, reducing (or preventing) the presence of free water in the liquid. Examples of suitable free water control additives include, but are not limited to, bentonite, amorphous silica, hydroxyethyl cellulose, and combinations thereof. Where used, the free water control additive may be present in an amount in the range of about 0.1% to about 16% by weight of the spacer fluid, for example.

A wide variety of additional additives may be included in the spacer fluids as deemed appropriate by one skilled in the art, with the benefit of this disclosure. Examples of such additives include, but are not limited to, weighting agents, viscosifying agents (e.g., clays, hydratable polymers, guar gum), fluid loss control additives, lost circulation materials, filtration control additives, dispersants, defoamers, corrosion inhibitors, scale inhibitors, formation conditioning agents. Specific examples of these, and other, additives include organic polymers, surfactants, crystalline silica, amorphous silica, fumed silica, salts, fibers, hydratable clays, microspheres, rice husk ash, combinations thereof, and the like. A person having ordinary skill in the art, with the benefit of this disclosure, will be able to determine the type and amount of additive useful for a particular application and desired result.

An example method of the present invention includes a method of enhancing rheological properties of a spacer fluid. The method may comprise including biowaste ash and/or CKD in a spacer fluid. The biowaste ash and/or CKD may be included in the spacer fluid in an amount sufficient to provide a higher yield point than a first fluid. The higher yield point may be desirable, for example, to effectively displace the first fluid from the well bore. As used herein, the term "yield point" refers to the resistance of a fluid to initial flow, or representing the stress required to start fluid movement. In an embodiment, the yield point of the spacer fluid at a temperature of up to about 180° F. is greater than about 5 lb/100 ft². In an embodiment, the yield point of the spacer fluid at a temperature of up to about 180° F. is greater than about 10 lb/100 ft². In an embodiment, the yield point of the spacer fluid at a temperature of up to about 180° F. is greater than about 20 lb/100 ft². It may be desirable for the spacer fluid to not thermally thin to a yield point below the first fluid at elevated temperatures. Accordingly, the spacer fluid may have a higher yield point than the first fluid at elevated temperatures, such as 180° F. or bottom hole static temperature ("BHST"). In one embodiment, the spacer fluid may have a yield point that increases at elevated temperatures. For example, the spacer fluid may have a yield point that is higher at 180° F. than at 80° F. By way of further example. The spacer fluid may have a yield point that is higher at BHST than at 80° F.

As previously mentioned, embodiments of the spacer fluids may be consolidating in that the spacer fluids may develop gel strength and/or compressive strength in the well bore. Consolidation is defined herein as one of three types of material behavior: Type 1 consolidation is identifiable as a gelled fluid that can be moved and/or pumped when the hydraulic shear stress exceeds the yield point (YP) of the gel. Type 2 consolidation is identifiable as a plastic semi-solid that can experience "plastic deformation" if the shear stress, compressive stress, or tensile stress exceeds the "plastic yield limit." Type 3 consolidation is identifiable as a rigid solid similar to regular set cement. During a steady progressive strain rate during conventional compressive testing, both confined and unconfined, a Type 3 consolidated material would exhibit linear elastic Hookean stress-strain behavior, followed by some plastic yield and/or mechanical failure. This novel consolidating spacer fluid may transform from the pumpable fluid that was placed during the normal displacement operation to Type 1 and/or further progress to Type 2 and/or further progress to Type 3.

Specific examples of how to characterize a Type 1 consolidation include measuring the yield stress. A Type 1 consolidation exhibits a YP from about 25 Pascals to about 250 Pascals, where YP is measured by one of the methods described in U.S. Pat. No. 6,874,353, namely: using a series of parallel vertical blades on a rotor shaft, referred to by those skilled in the art as the "Vane Method"; or using the new device and method also described in U.S. Pat. No. 6,874,353. Another method used to define the YP of Type 1 consolidation is defined in Morgan, R. G., Suter, D. A., and Sweat, V. A., *Mathematical Analysis of a Simple Back Extrusion Rheometer*, ASAE Paper No. 79-6001. Additionally, other methods commonly known to those skilled in the art may be used to define the YP of Type 1 consolidated spacer fluids. Alternatively, another method of characterizing a Type 1 consolidation include measuring the gelled strength of the material, which may be defined as "Static Gel Strength" (SGS) as is defined and measured in accordance with the API Recommended Practice on *Determining the Static Gel Strength of Cement Formations*, ANSI/API Recommended Practice 10B-6. A Type 1 consolidation may exhibit SGS values from about 70 lbf/100 ft² up to about 500 lbf/100 ft².

Specific examples of how to characterize a Type 2 consolidation include measuring the yield limit in compression (YL-C). The YL-C is simply the uniaxial compressive stress at which the material experiences a permanent deformation. Permanent deformation refers to a measurable deformation strain that does not return to zero over a period of time that is on the same order of magnitude as the total time required to conduct the measurement. YL-C may range from 1 psi (lbf/sq. in.) to 2,000 psi, with the most common values ranging from 5 psi to 500 psi.

Specific examples of how to characterize a Type 3 consolidation include measuring the compressive strength. Type 3 consolidation will exhibit unconfined uniaxial compressive strengths ranging from 5 psi to 10,000 psi, while the most common values will range from 10 psi to 2,500 psi. The values may be determined at 180° F. over 7 days. Typical sample geometry and sizes for measurement are similar to, but not limited to, those used for characterizing oil well cements: 2 inch cubes; or 2 inch diameter cylinders that are 4 inches in length; or 1 inch diameter cylinders that are 2 inches in length; and other methods known to those skilled in the art of measuring "mechanical properties" of oil well cements. For example, the compressive strength may be determined by crushing the samples in a compression-testing machine. The compressive strength is calculated from the failure load divided by the cross-sectional area resisting the load and is reported in units of pound-force per square inch (psi). Compressive strengths may be determined in accordance with API RP 10B-2, Recommended Practice for Testing Well Cements, First Edition, July 2005.

As a specific example of a consolidation, when left in a well bore annulus (e.g., between a subterranean formation and the pipe string disposed in the subterranean formation or between the pipe string and a larger conduit disposed in the subterranean formation), the spacer fluid may consolidate to develop static gel strength and/or compressive strength. The consolidated mass formed in the well bore annulus may act to support and position the pipe string in the well bore and bond the exterior surface of the pipe string to the walls of the well bore or to the larger conduit. The consolidated mass formed in the well bore annulus may also provide a substantially impermeable barrier to seal off formation fluids and gases and consequently also serve to mitigate potential fluid migration. The consolidated mass formed in the well bore annulus may also protect the pipe string or other conduit from corrosion.

Embodiments of the spacer fluids of the present invention may have a transition time that is shorter than the transition time of cement compositions subsequently introduced into the well bore. The term "transition time," as used herein, refers to the time for a fluid to progress from a static gel strength of about 100 lbf/100 ft² to about 500 lbf/100 ft². By having a shorter transition time, the consolidating spacer fluid can reduce or even prevent migration of gas in the well bore, even if gas migrates through a subsequently introduced cement composition before it has developed sufficient gel strength to prevent such migration. Gas and liquid migration can typically be prevented at a static gel strength of 500 lbf/100 ft². By reducing the amount of gas that can migrate through the well bore, the subsequently added cement compositions can progress through its slower transition period without gas migration being as significant factor as the cement develops static gel strength. Some embodiments of the consolidating spacer fluids may have a transition time (i.e., the time to progress from a static gel strength of about 100 lbf/100 ft² to about 500 lbf/100 ft²) at well bore conditions of about 45 minutes or less, about 30 minutes or less, about 20 minutes or less, or about 10 minutes or less. Embodiments of the consolidating spacer fluids also quickly develop static gel strengths of about 100 lbf/100 ft² and about 500 lbf/100 ft², respectively, at well bore conditions. The time for a fluid to a develop a static gel strength of about 100 lbf/100 ft² is also referred to as the "zero gel time." For example, the consolidating spacer fluids may have a zero gel time at well bore condition of about 8 hours or less, and, alternatively, about 4 hours or less. In some embodiments, the consolidating spacer fluids may have a zero gel time in a range of from about 0 minutes to about 4 hours or longer. By way of further example, the consolidating spacer fluids may develop static gel strengths of about 500 lbf/100 ft$^2$ or more at well bore conditions in a time of from about 10 minutes to about 8 hours or longer. The preceding time for development of static gel strengths are listed as being at well bore conditions. Those of ordinary skill in the art will understand that particular well bore conditions (e.g., temperature, pressure, depth, etc.) will vary; however, embodiments of the spacer should meet these specific requirements at well bore conditions. Static gel strength may be measured in accordance with API Recommended Practice on *Determining the Static Gel Strength of Cement Formations*, ANSI/API Recommended Practice 10B-6.

Embodiments of the spacer fluids of the present invention may be prepared in accordance with any suitable technique. In some embodiments, the desired quantity of water may be introduced into a mixer (e.g., a cement blender) followed by the dry blend. The dry blend may comprise the CKD and/or biowaste ash, as well as additional solid additives, for example. Additional liquid additives, if any, may be added to the water as desired prior to, or after, combination with the dry blend. This mixture may be agitated for a sufficient period of time to form a base slurry. This base slurry may then be introduced into the well bore via pumps, for example. In the foamed embodiments, the base slurry may be pumped into the well bore, and a foaming agent may be metered into the base slurry followed by injection of a gas, e.g., at a foam mixing "T," in an amount sufficient to foam the base slurry thereby forming a foamed spacer fluid, in accordance with embodiments of the present invention. After foaming, the foamed spacer fluid may be introduced into a well bore. As will be appreciated by those of ordinary skill in the art, with the benefit of this disclosure, other suitable techniques for preparing spacer fluids may be used in accordance with embodiments of the present invention.

An example method of the present invention includes a method of enhancing rheological properties of a spacer fluid. The method may comprise including CKD in a spacer fluid. The CKD may be included in the spacer fluid in an amount sufficient to provide a higher yield point than a first fluid. The higher yield point may be desirable, for example, to effectively displace the first fluid from the well bore. As used herein, the term "yield point" refers to the resistance of a fluid to initial flow, or representing the stress required to start fluid movement. In an embodiment, the yield point of the spacer fluid at a temperature of up to about 180° F. is greater than about 5 lb/100 ft$^2$. In an embodiment, the yield point of the spacer fluid at a temperature of up to about 180° F. is greater than about 10 lb/100 ft$^2$. In an embodiment, the yield point of the spacer fluid at a temperature of up to about 180° F. is greater than about 20 lb/100 ft$^2$. It may be desirable for the spacer fluid to not thermally thin to a yield point below the first fluid at elevated temperatures. Accordingly, the spacer fluid may have a higher yield point than the first fluid at elevated temperatures, such as 180° F. or bottom hole static temperature ("BHST"). In one embodiment, the spacer fluid may have a yield point that increases at elevated temperatures. For example, the spacer fluid may have a yield point that is higher at 180° F. than at 80° F. By way of further example. The spacer fluid may have a yield point that is higher at BHST than at 80° F.

Another example method of the present invention includes a method of displacing a first fluid from a well bore, the well bore penetrating a subterranean formation. The method may comprise providing a spacer fluid that comprises biowaste ash, CKD, and/or water. The method may further comprise introducing the spacer fluid into the well bore to displace at least a portion of the first fluid from the well bore. In some embodiments, the spacer fluid may displace the first fluid from a well bore annulus, such as the annulus between a pipe string and the subterranean formation or between the pipe string and a larger conduit. In some embodiments, the spacer fluid may be characterized by having a higher yield point than the first fluid at 80° F. In some embodiments, the spacer fluid may be characterized by having a higher yield point than the first fluid at 130° F. In some embodiments, the spacer fluid may be characterized by having a higher yield point than the first fluid at 180° F.

In an embodiment, the first fluid displaced by the spacer fluid comprises a drilling fluid. By way of example, the spacer fluid may be used to displace the drilling fluid from the well bore. In addition to displacement of the drilling fluid from the well bore, the spacer fluid may also remove the drilling fluid from the walls of the well bore. The drilling fluid may include, for example, any number of fluids, such as solid suspensions, mixtures, and emulsions. In some embodiments, the drilling fluid may comprise an oil-based drilling fluid. An example of a suitable oil-based drilling fluid comprises an invert emulsion. In some embodiments, the oil-based drilling fluid may comprise an oleaginous fluid. Examples of suitable oleaginous fluids that may be included in the oil-based drilling fluids include, but are not limited to, α-olefins, internal olefins, alkanes, aromatic solvents, cycloalkanes, liquefied petroleum gas, kerosene, diesel oils, crude oils, gas oils, fuel oils, paraffin oils, mineral oils, low-toxicity mineral oils, olefins, esters, amides, synthetic oils (e.g., polyolefins), polydiorganosiloxanes, siloxanes, organosiloxanes, ethers, acetals, dialkylcarbonates, hydrocarbons, and combinations thereof. Additional steps in embodiments of the method may comprise introducing a pipe string into the well bore, introducing a cement composition into the well bore with the spacer fluid separating the cement composition and the first fluid. In an embodiment, the cement composition may be allowed to set in the well bore. The cement composition may include, for example, cement and water.

Another example method of the present invention includes a method of separating fluids in a well bore, the well bore penetrating a subterranean formation. The method may comprise introducing a spacer fluid into the well bore, the well bore having a first fluid disposed therein. The spacer fluid may comprise, for example, biowaste ash, water, and/or CKD. The method may further comprise introducing a second fluid into the well bore with the spacer fluid separating the first fluid and the second fluid. In an embodiment, the first fluid comprises a drilling fluid and the second fluid comprises a cement composition. By way of example, the spacer fluid may prevent the cement composition from contacting the drilling fluid. In an embodiment, the cement composition comprises CKD, water, and a hydraulic cementitious material. A variety of hydraulic cements may be utilized in accordance with the present invention, including, but not limited to, those comprising calcium, aluminum, silicon, oxygen, iron, and/or sulfur, which set and harden by reaction with water. Suitable hydraulic cements include, but are not limited to, Portland cements, pozzolana cements, gypsum cements, high alumina content cements, slag cements, silica cements, and combinations thereof. In certain embodiments, the hydraulic cement may comprise a Portland cement. In some embodiments, the Portland cements that are suited for use in the present invention are classified as Classes A, C, H, and G cements according to American Petroleum Institute, *API Specification for Materials and Testing for Well Cements*, API Specification 10, Fifth Ed., Jul. 1, 1990. The spacer fluid may also remove the drilling fluid, dehydrated/gelled drilling fluid, and/or filter cake solids from the well bore in advance of the cement composition. Removal of these compositions from the well bore may enhance bonding of the cement composition to surfaces in the well bore. In an additional embodiment, at least a portion of used and/or unused biowaste ash and/or CKD containing consolidated spacer fluid are included in the cement composition that is placed into the well and allowed to set.

In some embodiments, at least a portion of the spacer fluid may be left in the well bore such that the spacer fluid consolidates in the well bore. In some embodiments, the spacer fluid may consolidate to form an annular sheath of a rigid solid. The annular sheath of may bond the exterior surface of the pipe string to the walls of the well bore or to the larger conduit. An example method of the present invention may further include measuring the consolidation of the spacer fluid. This measurement may also include a measurement of the integrity of the bond foimed between the consolidated spacer fluid and the exterior wall of the pipe string and/or between the consolidated spacer fluid and the formation or larger conduit disposed in the well bore. In some embodiments, data may be collected corresponding to the integrity of this bond, and the data may be recorded on a log, commonly referred to as a "bond long." The bond log may be used to, for example, analyze the consolidation properties of the spacer fluid in the well bore. Accordingly, embodiments may include running a cement bond log on at least the portion of the well bore containing the consolidated spacer fluid. The cement bond log for the settable spacer fluid may be obtained by any method used to measure cement integrity without limitation. In some embodiments, a tool may be run into the well bore on a wireline that can detect the bond of the set spacer fluid to the pipe string and/or the formation (or larger conduit). An example of a suitable tool includes a sonic tool.

Example Cement Compositions

An embodiment of the cement compositions of the present invention comprises CKD, biowaste ash, and water. The cement compositions optionally may comprise a number of additional components, including fly ash, a natural pozzolan, metakaolin, shale, slag, zeolite, and combinations thereof. In certain embodiments, the cement compositions may be foamed with a gas. Embodiments of the present invention also include methods of cementing that comprise: introducing the cement composition into a subterranean formation; and allowing the cement composition to set in the subterranean formation.

CKD may be included in embodiments of the cement compositions of the present invention. Where present, the CKD may be included in the cement compositions in an amount sufficient to provide, for example, the desired compressive strength, density, and/or cost reduction. In some embodiments, the CKD may be present in the cement compositions of the present invention in an amount of about 0.1% to about 99% bwoc. For example, the CKD may be present in an amount of about 0.1%, about 10%, about 20%, about 30%, about 40%, about 50%, about 60%, about 70%, about 80%, about 90%, or about 99% bwoc. In some embodiments, the CKD may be present in the cement compositions of the present invention in an amount of about 1% to about 50% bwoc. In some embodiments, the CKD may be present in the cement compositions in an amount of about 75% to about 99% bwoc. In some embodiments, the CKD and biowaste ash may be present, in any ratio amount, in an amount in the range of from about 1% to 100% by weight of the cementitious components therein. One of ordinary skill in the art, with the benefit of this disclosure, will recognize the appropriate amount of the CKD to include for a chosen application. While the preceding description describes CKD, the present invention is broad enough to encompass the use of other partially calcined kiln feeds. For example, embodiments of the spacer fluids may comprise lime kiln dust.

Biowaste ash, as described above may be used in embodiments of the present invention. As used as a component of the cement compositions, the biowaste ash may be included in embodiments of the cement compositions in an amount sufficient for a particular application. By way of example, the biowaste may be used to replace higher cost cementitious components, such as Portland cement, resulting in more economical cement compositions. In addition, biowaste ashes can contain large amounts of silica which can form the basis of a pozzolan reaction, for example, the reaction of silica oxides with calcium hydroxide during the hydration process. The biowaste ash may react, for example, with excess hydrated lime present in the cement composition during hydration. In addition, hydrated lime may be added to the cement composition, for example, to provide sufficient calcium ions for the biowaste ash to set. In some embodiments, the biowaste ash may be present in an amount of about 0.1% to about 99% bwoc. For example, the biowaste ash may be present in an amount of about 0.1%, about 10%, about 20%, about 30%, about 40%, about 50%, about 60%, about 70%, about 80%, about 90%, or about 99% bwoc. In some embodiments, the biowaste ash may be present in an amount about 1% to about 50% bwoc. In some embodiments, the biowaste ash may be present in an amount about 1% to about 25% bwoc. In some embodiments, the CKD and biowaste ash may be present, in any ratio amount, in an amount in the range of from about 1% to 100% by weight of the cementitious components therein. One of ordinary skill in the art will appreciate that embodiments of the cement compositions generally should have a biowaste ash and CKD concentration suitable to create a composition sufficient for a particular application.

The water used in embodiments of the cement compositions of the present invention may include, for example, freshwater, saltwater (e.g., water containing one or more salts dissolved therein), brine (e.g., saturated saltwater produced from subterranean formations), seawater, or combinations thereof. Generally, the water may be from any source, provided, for example, that it does not contain an excess of compounds that may undesirably affect other components in the cement composition. In some embodiments, the water may be included in an amount sufficient to form a pumpable slurry. In some embodiments, the water may be included in the cement compositions of the present invention in an amount of about 40% to about 200% bwoc. In some embodiments, the water may be included in an amount of about 40% to about 150% bwoc.

Those of ordinary skill in the art will appreciate that embodiments of the cement compositions generally should have a density suitable for a particular application. By way of example, embodiments of the cement compositions may have a density of about 4 pounds per gallon ("ppg") to about 20 ppg. In certain embodiments, the cement compositions may have a density of about 8 ppg to about 17 ppg. In certain embodiments, the cement composition may be a lightweight cement composition having a density of less than or equal to about 13 ppg. In other embodiments, the cement compositions may be foamed and have a density of about 4 ppg to about 13 ppg. Embodiments of the cement compositions may be foamed or unfoamed or may comprise other means to reduce their densities, such as a lightweight additive. Lightweight additives are generally additives that may be included in a cement composition to reduce its density below about 13 ppg and may include, for example, bentonite, gilsonite, expanded perlite, and microspheres (e.g., glass spheres). Those of ordinary skill in the art, with the benefit of this disclosure, will recognize the appropriate density for a particular application.

Hydraulic cement is a component that may be included in embodiments of the cement compositions of the present invention. Any of a variety of hydraulic cements suitable for use in subterranean cementing operations may be used in accordance with embodiments of the present invention. Suitable examples include hydraulic cements that comprise calcium, aluminum, silicon, oxygen and/or sulfur, which set and harden by reaction with water. Such hydraulic cements, include, but are not limited to, Portland cements, pozzolana cements, gypsum cements, high-alumina-content cements, slag cements, silica cements and combinations thereof. In certain embodiments, the hydraulic cement may comprise a Portland cement. The Portland cements that may be suited for use in embodiments of the present invention are classified as Class A, C, G and H cements according to American Petroleum Institute, *API Specification for Materials and Testing for Well Cements*, API Specification 10, Fifth Ed., Jul. 1, 1990. In addition, in some embodiments, hydraulic cements suitable for use in the present invention may include cements classified as ASTM Type I, II, or III.

Where present, the hydraulic cement generally may be included in embodiments of the cement compositions in an amount sufficient to provide, for example, the desired compressive strength, density, and/or cost. In some embodiments, the hydraulic cement may be present in the cement compositions of the present invention in an amount of about 0.01% to about 99% bwoc. In some embodiments, the hydraulic cement may be present in the cement compositions of the present invention in an amount of about 1% to about 95% bwoc. In some embodiments, the hydraulic cement may be present in the cement compositions of the present invention in an amount of about 1% to about 75% bwoc. In some embodiments, the hydraulic cement may be present in the cement compositions of the present invention in an amount of about 1% to about 50% bwoc.

Lime may be included in embodiments of the cement compositions of the present invention. In certain embodiments, the lime may be hydrated lime. In certain embodiments, the lime present in the cement composition may comprise, for example, a combination of unhydrated and hydrated lime. Where present, the lime may be present in the cement compositions in an amount of about 0.1% to about 40% bwoc. In some embodiments, the lime may be present in the cement compositions in an amount of about 1% to about 20% bwoc. One of ordinary skill in the art, with the benefit of this disclosure, will recognize the appropriate amount of the lime to include for a chosen application.

Embodiments of the cement compositions of the present invention may be foamed, for example, further comprising a gas and a surfactant, in accordance with embodiments of the present invention. A foamed cement composition may be used, for example, where it is desired for the cement composition to be lightweight. For example, a foamed cement composition of the present invention may comprise CKD, biowaste ash, a gas, a surfactant, and water. Other suitable additives, such as those discussed herein, also may be included in embodiments of the foamed cement compositions of the present invention as desired by those of ordinary skill in the art, with the benefit of this disclosure.

The gas used in embodiments of the foamed cement compositions may be any gas suitable for foaming a cement composition, including, but not limited to, air, nitrogen, or combinations thereof. Generally, the gas may be present in embodiments of the foamed cement compositions of the present invention in an amount sufficient to form the desired foam. In certain embodiments, the gas may be present in the foamed cement compositions of the present invention in an amount of about 10% to about 80% by volume of the composition.

Where foamed, embodiments of the cement compositions further may comprise a surfactant. In some embodiments, the surfactant comprises a foaming and stabilizing surfactant composition. As used herein, a "foaming and stabilizing surfactant composition" refers to a composition that comprises one or more surfactants and, among other things, may be used to facilitate the foaming of a cement composition and also may stabilize the resultant foamed cement composition foamed therewith. Any suitable foaming and stabilizing surfactant composition may be used in the cement compositions of the present invention. Suitable foaming and stabilizing surfactant compositions may include, but are not limited to: mixtures of an ammonium salt of an alkyl ether sulfate, a cocoamidopropyl betaine surfactant, a cocoamidopropyl dimethylamine oxide surfactant, sodium chloride, and water; mixtures of an ammonium salt of an alkyl ether sulfate surfactant, a cocoamidopropyl hydroxysultaine surfactant, a cocoamidopropyl dimethylamine oxide surfactant, sodium chloride, and water; hydrolyzed keratin; mixtures of an ethoxylated alcohol ether sulfate surfactant, an alkyl or alkene amidopropyl betaine surfactant, and an alkyl or alkene dimethylamine oxide surfactant; aqueous solutions of an alpha-olefinic sulfonate surfactant and a betaine surfactant; and combinations thereof. In one certain embodiment, the foaming and stabilizing surfactant composition comprises a mixture of an ammonium salt of an alkyl ether sulfate, a cocoamidopropyl betaine surfactant, a cocoamidopropyl dimethylamine oxide surfactant, sodium chloride, and water. A suitable example of such a mixture is ZONESEAL® 2000 foaming additive, available from Halliburton Energy Services, Inc. Suitable foaming and stabilizing surfactant compositions are described in U.S. Pat. Nos. 6,797,054, 6,547,871, 6,367,550, 6,063,738, and 5,897,699, the entire disclosures of which are incorporated herein by reference. Generally, the surfactant may be present in the foamed cement compositions of the present invention in an amount sufficient to provide suitable foam. In some embodiments, the surfactant may be present in an amount of about 0.8% and about 5% by volume of the water ("bvow").

Other additives suitable for use in subterranean cementing operations also may be added to embodiments of the cement compositions, in accordance with embodiments of the present invention. Examples of such additives include, but are not limited to, strength-retrogression additives, set accelerators, set retarders, weighting agents, lightweight additives, gas-generating additives, mechanical property enhancing additives, lost-circulation materials, dispersants, a fluid loss control additive, defoaming agents, thixotropic additives, oil-swellable materials, water-swellable materials, and any combination thereof. Specific examples of these, and other, additives include fly ash, a natural pozzolan, metakaolin, shale, slag, zeolite, crystalline silica, amorphous silica, fumed silica, salts, fibers, hydratable clays, calcined shale, microspheres, pumicite, diatomaceous earth, elastomers, resins, latex, combinations thereof, and the like. A person having ordinary skill in the art, with the benefit of this disclosure, will readily be able to determine the type and amount of additive useful for a particular application and desired result.

Embodiments of the cement compositions of the present invention may be used in a variety of subterranean applications where cement compositions may be used, including, but not limited to, primary cementing, remedial cementing, and drilling operations. An example of a method of the present invention may comprise introducing a cement composition comprising CKD, water, and biowaste ash into a subterranean formation; and allowing the cement composition to set in the subterranean formation. The cement composition may set and form a hardened mass, the hardened mass may become impermeable. As desired by one of ordinary skill in the art, with the benefit of this disclosure, embodiments of the cement compositions of the present invention useful in this method may comprise any of the above-listed additives, as well any of a variety of other additives suitable for use in subterranean applications. In example primary cementing embodiments, a cement composition may be introduced into a space between a subterranean formation and a conduit (e.g., casing, expandable casing, liners, etc.) or between the conduit and a larger conduit in the well bore. Generally, in most instances, the hardened mass should fix the conduit in the well bore. In addition, in example remedial cementing embodiments, a cement composition may be used, for example, in squeeze cementing operations or in the placement of cement plugs.

Another example of a method of the present invention is a method of cementing that may comprise introducing a lightweight cement composition into a subterranean formation. Embodiments of the lightweight cement composition have a density of less than about 13 lb/gal and may comprise CKD, water, biowaste ash, and a lightweight additive (e.g., bentonite, gilsonite, expanded perlite, microspheres, etc.). The method further may comprise allowing the lightweight cement composition to set in the subterranean formation. As desired by one of ordinary skill in the art, with the benefit of this disclosure, embodiments of the lightweight cement compositions of the present invention useful in this method may comprise any of the above-listed additives, as well any of a variety of other additives suitable for use in subterranean applications.

Another example of a method of the present invention is a method of cementing that may comprise introducing a foamed cement composition that comprises CKD, biowaste ash, a gas, a surfactant, and water into a subterranean formation. The method further may comprise allowing the foamed cement composition to set in the subterranean formation. As desired by one of ordinary skill in the art, with the benefit of this disclosure, embodiments of the foamed cement compositions of the present invention useful in this method may comprise any of the above-listed additives, as well any of a variety of other additives suitable for use in subterranean applications.

Another example of a method of the present invention is a method of cementing a conduit (e.g., casing, expandable casing, liners, etc.) disposed in a subterranean formation. For example, the cement composition may set in a well bore annulus outside a conduit disposed in the well bore. An example of such a method may comprise introducing a cement composition comprising CKD, water, and biowaste ash into the annulus between the conduit and the subterranean formation; and allowing the settable composition to set in the annulus to form a hardened mass. Generally, in most instances, the hardened mass should fix the conduit in the formation. The method further may comprise, for example, introducing the conduit into the subterranean formation. As desired by one of ordinary skill in the art, with the benefit of this disclosure, embodiments of the cement compositions of the present invention useful in this method may comprise any of the above-listed additives, as well any of a variety of other additives suitable for use in subterranean applications.

In remedial-cementing embodiments, a settable composition may be used, for example, in squeeze-cementing operations or in the placement of plugs. By way of example, the settable composition may be placed in a well bore to plug a void or crack in the formation, in a gravel pack, in the conduit, in the cement sheath, and/or a microannulus between the cement sheath and the conduit. In another embodiment, the settable composition may be placed into a well bore to form a plug in the well bore with the plug, for example, sealing the well bore.

Another example of a method of the present invention is a method of sealing a portion of a gravel pack or a portion of a subterranean formation. An example of such a method may comprise introducing a cement composition comprising CKD, biowaste ash, and water into the portion of the gravel pack or the portion of the subterranean formation; and allowing the cement composition to form a hardened mass in the portion. The portions of the subterranean formation may include permeable portions of the formation and fractures (natural or otherwise) in the formation and other portions of the formation that may allow the undesired flow of fluid into, or from, the well bore. The portions of the gravel pack may include those portions of the gravel pack, wherein it is desired to prevent the undesired flow of fluids into, or from, the well bore. Among other things, this method may allow the sealing of the portion of the gravel pack to prevent the undesired flow of fluids without requiring the gravel pack's removal. As desired by one of ordinary skill in the art, with the benefit of this disclosure, embodiments of the cement compositions of the present invention useful in this method may comprise any of the above-listed additives, as well any of a variety of other additives suitable for use in subterranean applications.

Another example of a method of the present invention is a method of sealing voids located in a conduit (e.g., casing, expandable casings, liners, etc.) or in a cement sheath. Generally, the conduit may be disposed in a well bore, and the cement sheath may be located in the annulus between the conduit and a subterranean formation. An example of such a method may comprise introducing a composition comprising CKD, biowaste ash, and water into the void; and allowing the cement composition to set to form a hardened mass in the void. As desired by one of ordinary skill in the art, with the benefit of this disclosure, embodiments of compositions of the present invention useful in this method may comprise any of the above-listed additives, as well any of a variety of other additives suitable for use in subterranean applications.

When sealing a void in a conduit, embodiments of the methods of the present invention, in some embodiments, further may comprise locating the void in the conduit; and isolating the void by defining a space within the conduit in communication with the void, wherein the settable composition may be introduced into the void from the space. The void may be isolated using any suitable technique and/or apparatus, including bridge plugs, packers, and the like. The void in the conduit may be located using any suitable technique. When sealing a void in the cement sheath, the methods of the present invention, in some embodiments, further may comprise locating the void in the cement sheath; producing a perforation in the conduit that intersects the void; and isolating the void by defining a space within the conduit in communication with the void via the perforation, wherein the cement composition is introduced into the void via the perforation. The void in the conduit may be located using any suitable technique. The perforation may be created in the conduit using any suitable technique, for example, perforating guns. The void may be isolated using any suitable technique and/or apparatus, including bridge plugs, packers, and the like.

Another example of a method of the present invention is a method of forming a plug in a well bore. An example of such a method may include introducing a introducing a cement composition comprising CKD, biowaste ash, and water into the well bore at a location in the well bore; and allowing the cement composition to set to form the plug in the well bore. The plug may be formed, for example, when plugging and abandoning the well or to form a kickoff plug when changing the direction of drilling the well bore. An example of changing the direction of drilling a well bore may comprise introducing a cement composition comprising CKD, biowaste ash, and water into the well bore at a location in the well bore wherein the direction of drilling is to be changed; allowing the cement composition to set to form a kickoff plug in the well bore; drilling a hole in the kickoff plug; and drilling of the well bore through the hole in the kickoff plug. As desired by one of ordinary skill in the art, with the benefit of this disclosure, embodiments of the cement compositions of the present invention useful in this method further may comprise any of the above-listed additives, as well any of a variety of other additives suitable for use in subterranean applications.

Generally, the drilling operation may continue, for example, in the direction of the hole drilled through the kickoff plug. The well bore and hole in the kickoff plug may be drilled using any suitable technique, including rotary drilling, cable tool drilling, and the like. In some embodiments, one or more oriented directional drilling tools may be placed adjacent to the kickoff plug. Suitable directional drilling tools include, but are not limited to, whip-stocks, bent sub-downhole motorized drill combinations, and the like. The direction drilling tools then may be used to drill the hole in the kickoff plug so that the hole is positioned in the desired direction. Optionally, the directional drilling tool may be removed from the well bore subsequent to drilling the hole in the kickoff plug.

In accordance with embodiments of the present composition, the cement compositions of the present invention may utilize a packing volume fraction suitable for a particular application as desired. As used herein, the term "packing volume fraction" refers to the volume of the particulate materials in a fluid divided by the total volume of the fluid. The size ranges of the preferred particulate materials may be selected, as well as their respective proportions, in order to provide a maximized packing volume fraction so that the fluid is in a hindered settling state. It is known that, in such a state, the particulate materials behave "collectively" like a porous solid material. The hindered settling state is believed to correspond, in practice, to a much higher solid material concentration in the fluid than that present in the some traditional cement compositions.

Embodiments of the present invention may include a combination of at least three features to obtain a maximum packing volume. One is the use of at least three particulate materials wherein the alt least three particulate materials are in size ranges "disjointed" from one another. In some embodiments, each of the three particulate materials may include a different particle size selected from the following ranges: about 7 nm to about 50 nm, about 0.05 microns to about 0.5 microns, 0.5 microns to about 10 microns, about 10 microns to about 20 microns, about 20 microns to about 200 microns, about 200 microns to about 800 microns, and greater than about 1 millimeter. For example, a first particulate material may include particles sized from about 7 nm to about 50 nm, a second particulate material may include particles sized from about 0.05 microns to about 0.5 microns, and a third particulate material may include particles sized from about 10 microns to about 20 microns. Another aspect of embodiments of the present invention present embodiments may include a choice of the proportions of the three particulate materials in relation to the mixing, such that the fluid, when mixed, is in a hindered settling state. Another feature may include the choice of the proportions of the three particulate materials between each other, and according to their respective size ranges, such that the maximum packing volume fraction is at least substantially achieved for the sum total of all particulate materials in the fluid system. In accordance with embodiments of the present invention, biowaste ash may be used to obtain a maximum packing volume fraction. By way of example, biowaste ash having a particle size of about 7 nm to about 1 millimeter may be used to obtain a maximum packing volume fraction. Packing volume fraction is described in further detail in U.S. Pat. No. 5,518,996 and U.S. Pat. No. 7,213,646, the entire disclosures of which are incorporated herein by reference.

While the preceding discussion is directed to the use biowaste ash and/or CKD in spacer fluids and cement compositions, those of ordinary skill in the art will appreciate that the present technique also encompasses the use of biowaste ash and/or CKD in any of a variety of different subterranean treatments. For example, the biowaste ash and/or CKD may be included in any of a number of well treatment fluids that may be used in subterranean treatments, including drilling fluids, completion fluids, stimulation fluids and well clean-up fluids.

To facilitate a better understanding of the present invention, the following examples of certain aspects of some embodiments are given. In no way should the following examples be read to limit, or define, the scope of the invention.

Example 1

A series of samples were prepared and subjected to compressive strength tests in accordance with API Specification 10 to analyze force resistance properties of compositions comprising CKD and rice hull ash. The sample compositions were allowed to cure in a water bath at the 170° F. for twenty-four hours. Immediately after removal from the water bath, the compressive strength of each sample was determined by using a Tinius Olsen tester. The results of the compressive strength tests are set forth in the table below. Test Nos. 1-12 were performed on samples with a density measured in pounds per gallon. Samples may comprise water, CKD, rice hull ash, hydrated lime, or CFR-3™ cement friction reducer. The CKD used was supplied by Holcim (US) Inc., from Ada, Okla. The rice hull ash was obtained from Rice Land Foods, from Stuttgart, Ark. CFR-3™ cement friction reducer is a cement additive available from Halliburton Energy Services, Inc. Concentrations of individual components are measured as a percent by weight of cementitious components (% bwoc), wherein the weight of the cementitious components is the weight of the CKD, rice hull ash, lime, or combination of the three (if present), as indicated in the table below.

TABLE 1

Compressive Strength Tests

| Test No. | Density (ppg) | Water (% bwoc) | CKD (% bwoc) | Rice Hull (% bwoc) | Hydrated Lime (% bwoc) | CFR-3 (% bwoc) | Compressive Strength (psi) |
|---|---|---|---|---|---|---|---|
| 1 | 14.5 | 48.75 | 100 | — | — | 0.75 | 1437 |
| 2 | 14.5 | 48.9 | 95 | 5 | — | 0.75 | 1542 |
| 3 | 14.5 | 48.23 | 90.5 | 4.75 | 4.75 | 0.71 | 1400 |
| 4 | 14.5 | 49.06 | 90 | 10 | — | 0.75 | 1556 |
| 5 | 12.5 | 89.72 | 100 | — | — | — | 275 |
| 6 | 12.5 | 90.5 | 80 | 20 | — | — | 417 |
| 7 | 12.5 | 90.69 | 75 | 25 | — | — | 483 |
| 8 | 12.5 | 90.89 | 70 | 30 | — | — | 532 |
| 9 | 12.5 | 91.28 | 60 | 40 | — | — | 446 |
| 10 | 12.5 | 91.67 | 50 | 50 | — | 0.75 | 479 |
| 11 | 10.5 | 212.44 | 0 | 100 | — | — | Did not set |
| 12 | 10.5 | 209.25 | 0 | 90.9 | 9.1 | — | 17 |

Example 1 thus indicates that replacement of at least a portion of the rice hull ash with CKD may increase the compressive strength of the compositions. This appears to be true at both high densities and low densities.

It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Although individual embodiments are discussed, the invention covers all combinations of all those embodiments. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present invention. If there is any conflict in the usages of a word or term in this specification and one or more patent(s) or other documents that may be incorporated herein by reference, the definitions that are consistent with this specification should be adopted.

What is claimed is:

1. A method of treating a subterranean formation comprising:
   identifying a first yield point of a fluid in a wellbore;
   providing a treatment fluid comprising a kiln dust, biowaste ash, and water;
   adjusting a yield point of the treatment fluid to be greater than the first yield point, wherein adjusting comprises adjusting an amount of kiln dust, biowaste ash, or both included in the treatment fluid;
   wherein the biowaste ash comprises plant- or animal-derived waste products, wherein the plant-derived waste products are selected from the group consisting of sugar cane ash, wood ash, tree leave ash, corn cob ash, rice hull ash, grain ash, grain hull ash, grain husk ash, and combinations thereof and wherein the biowaste ash is present in an amount of about 1% to about 65% by weight of the treatment fluid;
   introducing the treatment fluid into a subterranean formation; and
   wherein the treatment fluid has a transition time to progress from a static gel strength of about 100 lbf/100 ft$^2$ to about 500 lbf/100 ft$^2$ at well bore conditions of about 45 minutes or less.

2. The method of claim 1 wherein the biowaste ash further comprises at least one biowaste ash selected from the group consisting of additional agricultural waste ash, municipal waste ash, municipal solid waste ash, waste-water treatment waste ash, animal waste ash, non-human ash, non-animal industrial waste ash, and combinations thereof.

3. The method of claim 1 wherein the biowaste ash comprises biowaste that was burned at a temperature of about 400° C. to about 900° C. for a time period of from about 2 hours to about 8 hours.

4. The method of claim 1 wherein the kiln dust is a partially calcined kiln feed removed from a gas stream comprising $SiO_2$, $Al_2O_3$, $Fe_2O_3$, $CaO$, $MgO$, $SO_3$, $Na_2O$, and $K_2O$.

5. The method of claim 1 wherein the kiln dust comprises cement kiln dust.

6. The method of claim 1 wherein the treatment fluid further comprises at least one component selected from the group consisting of fly ash, a natural pozzolan, metakaolin, shale, calcined shale, slag, zeolite, pumice, perlite, lime, rice husk ash, crystalline silica, amorphous silica, fumed silica, a salt, fiber, hydratable clay, a microsphere, pumicite, diatomaceous earth, an elastomer, a resin, latex, and combinations thereof.

7. The method of claim 1 wherein the treatment fluid further comprises at least one additive selected from the group consisting of a strength-retrogression additive, a set accelerator, a set retarder, a weighting agent, a lightweight additive, a gas-generating additive, a mechanical-property-enhancing additive, a lost-circulation material, a filtration-control additive, a dispersant, a fluid loss control additive, a defoaming agent, a foaming agent, a thixotropic additive, an oil-swellable material, a water-swellable material, and combinations thereof.

8. The method of claim 1 wherein the treatment fluid is a spacer fluid, the spacer fluid separating a first fluid from a second fluid in a well bore penetrating the subterranean formation.

9. The method of claim 8 wherein the kiln dust comprises cement kiln dust.

10. The method of claim 9 wherein the cement kiln dust is present in an amount of about 1% to about 100% by weight of the spacer fluid.

11. A method comprising:
identifying a first yield point of a first fluid in a wellbore;
providing a spacer fluid comprising biowaste ash and water;
adjusting a yield point of the spacer fluid to be greater than the first yield point, wherein adjusting comprises adjusting an amount of kiln dust, biowaste ash, or both included in the spacer fluid;
wherein the biowaste ash comprises plant- or animal-derived waste products, wherein the plant-derived waste products are selected from the group consisting of sugar cane ash, wood ash, tree leave ash, corn cob ash, rice hull ash, grain ash, grain husk ash, grain hull ash, orchard ash, vine trimming ash, grass ash, straw ash, ground nut shell ash, legume ash, and combinations thereof and wherein the biowaste ash is present in an amount of about 20% to about 65% by weight of the spacer fluid;
introducing the spacer fluid into a well bore to displace at least a portion of the first fluid from the well bore;
wherein the spacer fluid has a transition time to progress from a static gel strength of about 100 lbf/10 ft$^2$ to about 500 lbf/100 ft$^2$ at well bore conditions of about 45 minutes or less; and
introducing a cement composition into the well bore, wherein the spacer fluid separates the cement composition and the first fluid.

12. The method of claim 11 wherein the first fluid comprises a drilling fluid.

13. The method of claim 12 wherein the drilling fluid is an aqueous-based drilling fluid.

14. The method of claim 11 wherein the biowaste ash further comprises at least one biowaste ash selected from the group consisting of additional agricultural waste ash, municipal waste ash, municipal solid waste ash, waste-water treatment waste ash, animal waste ash, non-human ash, non-animal industrial waste ash, and combinations thereof.

15. The method of claim 11 wherein the biowaste ash further comprises additional agricultural waste ash.

16. The method of claim 11 wherein the biowaste ash further comprises municipal waste ash.

17. The method of claim 11 wherein the biowaste ash is present in the spacer fluid in an amount of about 1% to about 25% by weight of the spacer fluid.

18. The method of claim 11 wherein the biowaste ash is present in the spacer fluid in an amount of about 1% to about 10% by weight of the spacer fluid.

19. The method of claim 11 wherein the spacer fluid further comprises at least one additive selected from the group consisting of a clay, a hydratable polymer, guar gum, an organic polymer, a surfactant, crystalline silica, amorphous silica, fumed silica, a salt, a fiber, a microsphere, fly ash, rice husk ash, any combination thereof.

20. The method of claim 11 wherein the spacer fluid further comprises at least one additive selected from the group consisting of a free water control additive, a weighting agent, a viscosifying agent, a fluid loss control additive, a lost circulation material, a filtration control additive, a dispersant, a defoamer, a corrosion inhibitor, a scale inhibitor, a formation conditioning agent, and any combination thereof.

21. The method of claim 11 wherein the spacer fluid is foamed and further comprises a gas and a foaming and stabilizing surfactant composition.

22. The method of claim 11 wherein at least a portion of the spacer fluid remains in the well bore and consolidates in the well bore.

23. The method of claim 22 wherein the portion of the spacer fluid has a zero gel time of about 4 hours or less or a transition time of about 45 minutes or less.

24. The method of claim 22 further comprising running a bond log to measure consolidation properties of the portion of the spacer fluid in the well bore.

25. The method of claim 11 wherein the spacer fluid further comprises a partially calcined kiln feed removed from a gas stream comprising $SiO_2$, $Al_2O_3$, $Fe_2O_3$, CaO, MgO, $SO_3$, $Na_2O$, and $K_2O$.

* * * * *